United States Patent

Mizuno et al.

[11] Patent Number: 6,029,441
[45] Date of Patent: Feb. 29, 2000

[54] METHOD FOR EXHAUST GAS PURIFICATION AND SYSTEM FOR EXHAUST GAS PURIFICATION USED THEREIN

[75] Inventors: Hiroshige Mizuno, Tajimi; Naomi Noda, Ichinomiya; Yukinari Shibagaki, Kounan; Akira Takahashi, Nagoya, all of Japan

[73] Assignee: NGK Insulators, Ltd., Japan

[21] Appl. No.: 08/985,205

[22] Filed: Dec. 4, 1997

[30] Foreign Application Priority Data

Dec. 9, 1996 [JP] Japan .................................. 8-328899

[51] Int. Cl.⁷ ........................................................ F01N 3/20
[52] U.S. Cl. .................. 60/274; 60/276; 60/289; 60/297; 60/300
[58] Field of Search ............................ 60/274, 284, 289, 60/297, 298, 300, 311, 276

[56] References Cited

U.S. PATENT DOCUMENTS 5,662,869  9/1997  Abe et al. .............................. 60/297 X

FOREIGN PATENT DOCUMENTS

| 0639699 | 2/1995 | European Pat. Off. . |
| 0661098 | 7/1995 | European Pat. Off. . |
| 0697505 | 2/1996 | European Pat. Off. . |
| 0727567 | 8/1996 | European Pat. Off. . |
| 5-31320 | 2/1993 | Japan . |
| 5-321646 | 12/1993 | Japan . |
| 6-66134 | 3/1994 | Japan . |
| 6-173662 | 6/1994 | Japan . |
| 6-185343 | 7/1994 | Japan . |
| WO 96/24756 | 8/1996 | WIPO . |

*Primary Examiner*—Tony M. Argenbright
*Attorney, Agent, or Firm*—Parkhurst & Wendell, L.L.P.

[57] ABSTRACT

A method for exhaust gas purification using an exhaust gas purification system including (a) an adsorbent for adsorbing hydrocarbons in internal combustion engine exhaust gas provided in the engine exhaust pipe, (b) at least one catalyst for reducing harmful substances present in the exhaust gas, provided in the exhaust pipe upstream of the adsorbent in the flow direction of the exhaust gas, (c) at least one catalyst for reducing harmful substances present in the exhaust gas, provided in the exhaust pipe down-stream of the adsorbent in the flow direction of the exhaust gas, (d) a first inlet for introduction of secondary air into exhaust gas, formed in the exhaust pipe upstream of the most downstream catalyst of the catalyst (b), and (e) a second inlet for introduction of secondary air into exhaust gas, formed in the exhaust pipe between the catalyst (b) and the most downstream catalyst of the catalyst (c). Secondary air is introduced from the first inlet at a time from engine start to activation of catalyst (b); when catalyst (b) has been activated, stopping secondary air introduction from the first inlet; meanwhile, introducing secondary air from the second inlet while the hydrocarbons of exhaust gas adsorbed by adsorbent (a) are desorbed therefrom as its temperature rises by the heat of the exhaust gas. This method effectively purifies the hydrocarbons discharged from an internal combustion engine in a large amount during cold start, without adversely affecting the purification of also-discharged NOx.

40 Claims, 9 Drawing Sheets

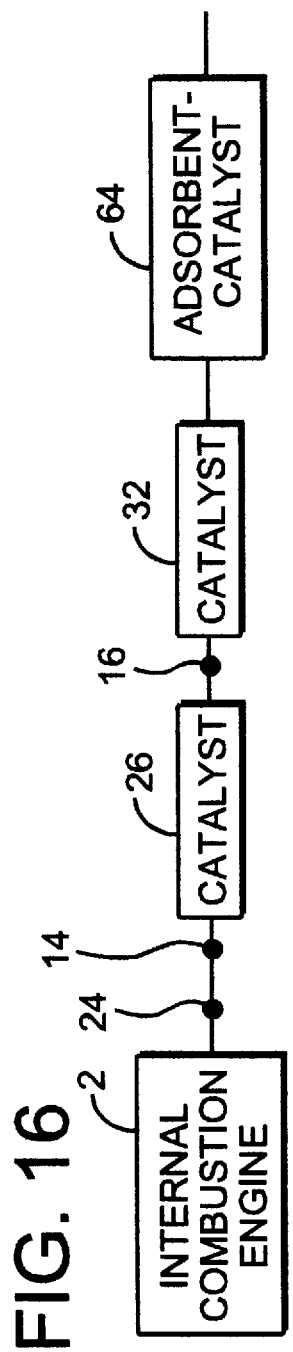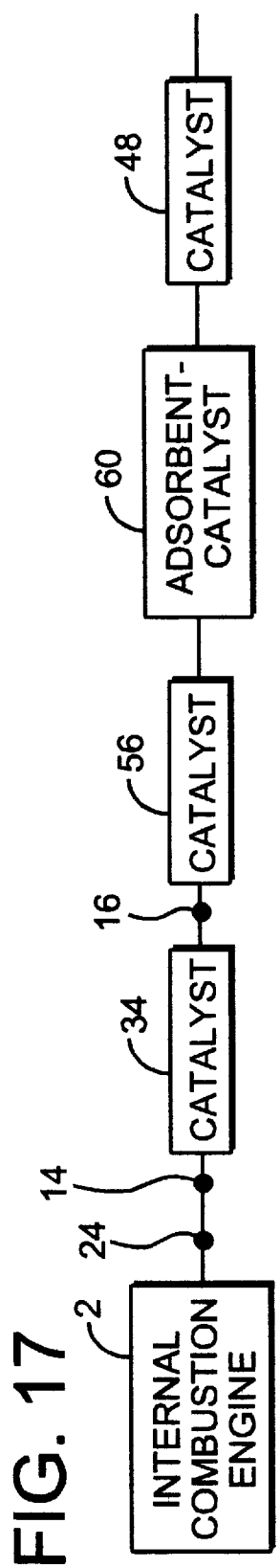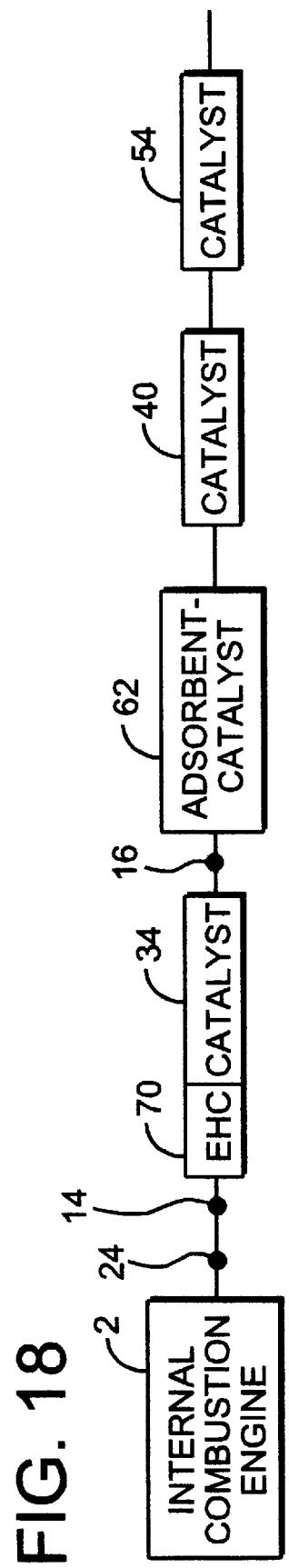

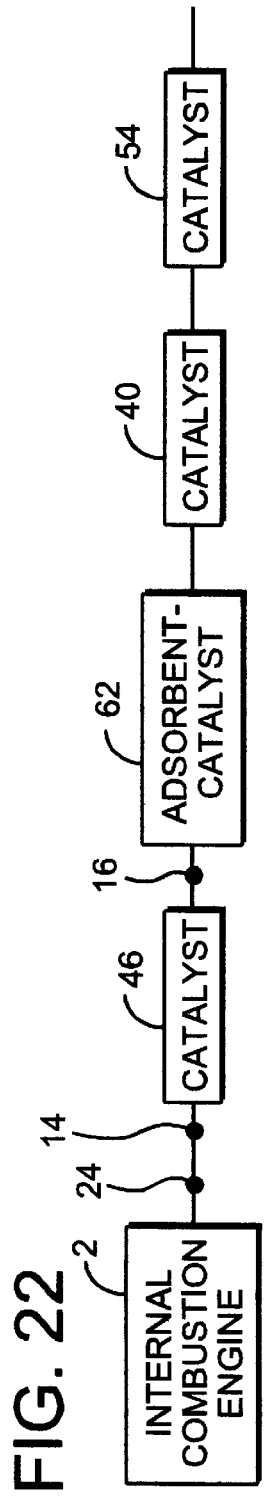
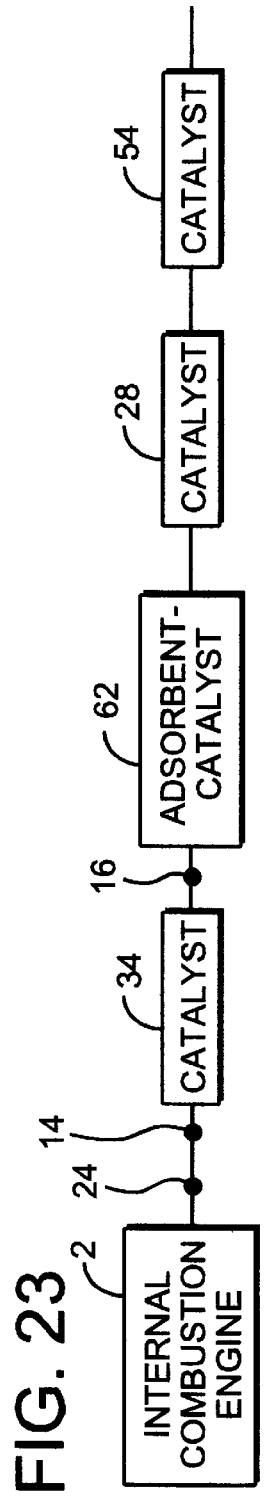
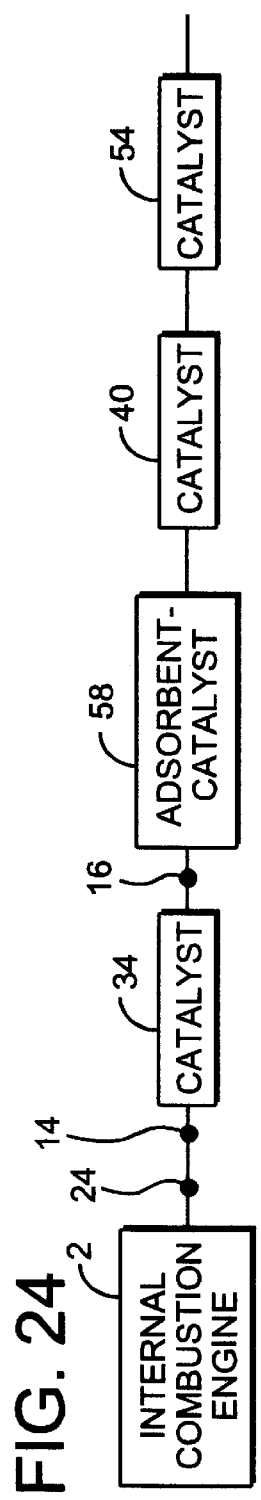
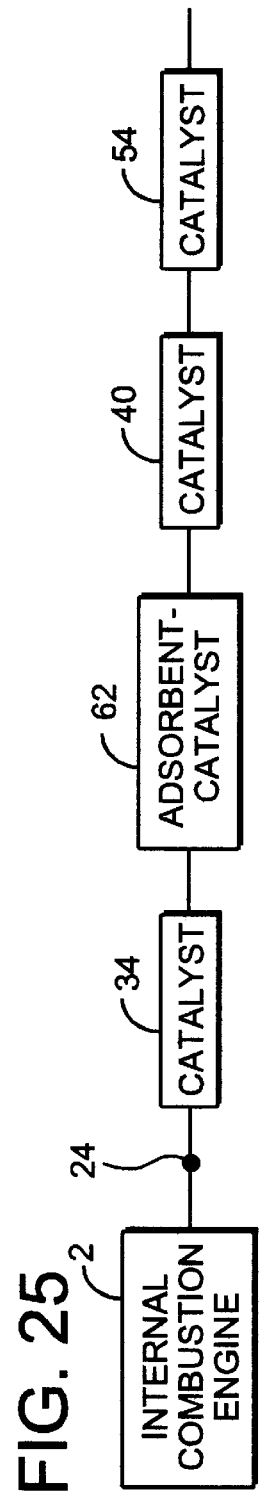

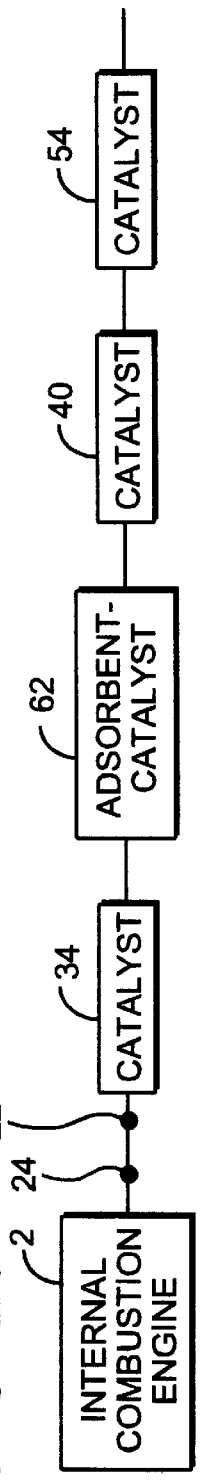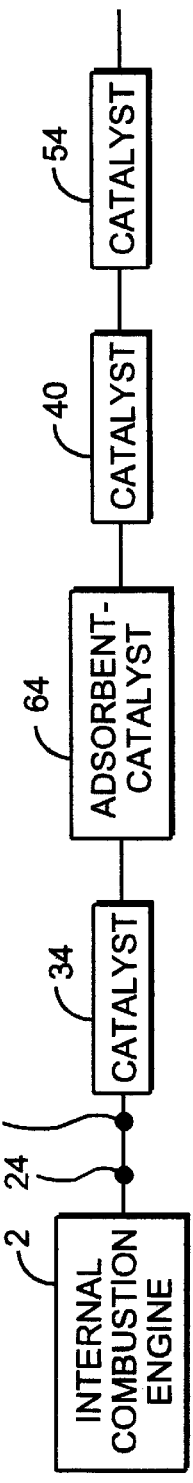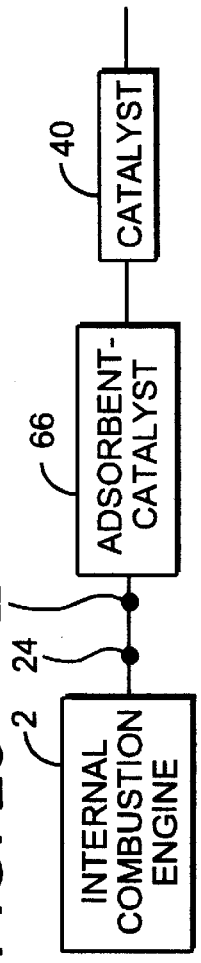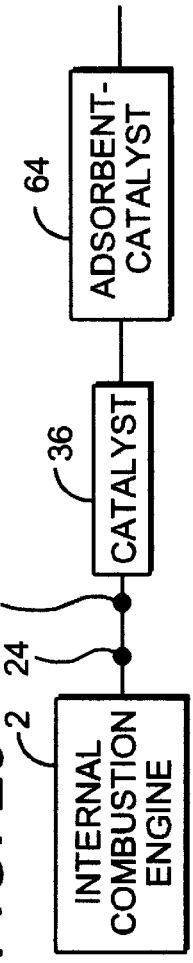

METHOD FOR EXHAUST GAS PURIFICATION AND SYSTEM FOR EXHAUST GAS PURIFICATION USED THEREIN

BACKGROUND OF THE INVENTION (1) Field of the Invention

The present invention relates to a method for exhaust gas purification, capable of effectively purifying harmful substances present in the exhaust gas emitted from an internal combustion engine, particularly hydrocarbons (HC) generated in a large amount during the cold start of the engine, without adversely affecting the purification of NOx also present in the exhaust gas, as well as to a system for exhaust gas purification used in the method.

(2) Description of Related Art

In order to activate the catalyst for exhaust gas purification provided in an exhaust pipe of an engine, at an early period during the cold start of the engine, there is known a technique of introducing secondary air into the exhaust pipe at a site of the pipe upstream of the catalyst in the flow direction of an exhaust gas passing through the pipe. During the cold start of an engine when the ratio of fuel to air is high (fuel rich), a combustion reaction by catalyst hardly takes place and, moreover, the heating of catalyst by the heat generated by the reaction is hardly expected; hence, in the above technique, it is hoped to, by introducing secondary air as mentioned above, adjust the composition of exhaust gas to a lean side (oxygen excessive) and promote the activation (start of combustion reaction) of catalyst.

There is also known a technique of (1) using a system provided in an exhaust pipe of an engine, comprising a catalyst and an adsorbent containing an adsorbent component (e.g. zeolite) capable of adsorbing hydrocarbons (HC) and (2) introducing secondary air into the exhaust pipe. In this technique, the adsorbent is used to adsorb and store the unburnt HC discharged from the engine in a large amount during the cold start, temporarily until the catalyst is activated.

As an example of the above technique, there is disclosed, in Japanese Patent Application Laid-Open No. 185343/-1994, a method for exhaust gas purification, which method uses a system for exhaust gas purification provided in an exhaust pipe of an internal combustion engine, comprising (1) an adsorbent containing an adsorbent component capable of adsorbing harmful substances (e.g. HC) present in the exhaust gas emitted from the engine and (2) a catalyst containing a catalyst component capable of reducing harmful substances present in the exhaust gas, which method comprises introducing an oxidizing gas (e.g. secondary air) into the exhaust gas for a certain period of the time span in which the HC., etc. present in the exhaust gas generated during the cold start of the internal combustion engine are adsorbed by the adsorbent and then are desorbed from the adsorbent with the temperature rise of the adsorbent brought about by the heat of exhaust gas.

In such a system for exhaust gas purification containing an adsorbent, as the adsorbent temperature rises owing to the heat of exhaust gas and the desorption of HC from adsorbent begins, the HC concentration in exhaust gas rises temporarily; therefore, even after the activation of catalyst, introduction of secondary air is continued until the desorption of HC from adsorbent is completed, in order to promote the purification (combustion) of the desorbed HC.

As a result, in a system using an adsorbent, as compared with a system using a catalyst alone, secondary air must be introduced for a long time. Since nitrogen oxides (NOx), which are also harmful substances present in exhaust gas, are hardly purified in a lean atmosphere even in the presence of a catalyst, the above conventional technique has had a problem in that the NOx level in exhaust gas is not reduced during the period of secondary air introduction. Thus, in the above conventional technique, although HC can be purified effectively during the cold start of the engine, NOx purification during the cold start has been insufficient.

OBJECT AND SUMMARY OF THE INVENTION

The present invention has been completed in view of the above situation. The objects of the present invention are to provide a method for exhaust gas purification, which can effectively purify the HC discharged in a large amount during the cold start of engine, without adversely affecting the purification of NOx also discharged, and a system for exhaust gas purification used in the method.

According to the present invention, there is provided a method for exhaust gas purification (a first purification method) by the use of a system for exhaust gas purification, which system comprises:

(a) an adsorbent containing an adsorbent component capable of adsorbing hydrocarbons present in the exhaust gas emitted from an internal combustion engine, provided in the exhaust pipe of the engine, (b) at least one catalyst containing a catalyst component capable of reducing harmful substances present in the exhaust gas, provided in the exhaust pipe at a site upstream of the adsorbent in the flow direction of the exhaust gas, (c) at least one catalyst containing a catalyst component capable of reducing harmful substances present in the exhaust gas, provided in the exhaust pipe at a site downstream of the adsorbent in the flow direction of the exhaust gas, (d) a first inlet for introduction of secondary air into exhaust gas, formed in the exhaust pipe at a site upstream of the most downstream catalyst of the catalyst (b), and (e) a second inlet for introduction of secondary air into exhaust gas, formed in the exhaust pipe at a site between the catalyst (b) and the most downstream catalyst of the catalyst (c), which method comprises introducing secondary air from the first inlet for a period from engine start to the activation of the catalyst (b) provided upstream of the adsorbent; at the time when the catalyst (b) has been activated, stopping the introduction of secondary air from the first inlet; and, introducing secondary air from the second inlet while the hydrocarbons of exhaust gas adsorbed by the adsorbent (a) are desorbed from the adsorbent (a) with the temperature rise of the adsorbent (a) brought about by the heat of the exhaust gas.

According to the present invention, there is also provided a method for exhaust gas purification (a second purification method) by the use of a system for exhaust gas purification, which system comprises:

(a) an adsorbent-catalyst containing an adsorbent component capable of adsorbing hydrocarbons present in the exhaust gas emitted from an internal combustion engine and a catalyst component capable of reducing harmful substances present in the exhaust gas, provided in the exhaust pipe of the engine, (b) at least one catalyst containing a catalyst component capable of reducing the harmful substances, provided in the exhaust pipe at a site downstream of the adsorbent-catalyst (a) in the flow direction of the exhaust gas, (c) a first inlet for introduction of secondary air into exhaust gas, formed in the exhaust pipe at a site upstream of the adsorbent-catalyst (a) in the flow direction of the exhaust gas, and (d) a second inlet for introduction of secondary air into exhaust gas, formed in the exhaust pipe at a site between the adsorbent-catalyst (a) and the most downstream catalyst of the catalyst (b), which method comprises introducing secondary air from the first inlet for a period from engine start to the activation of the catalyst component of the adsorbent-catalyst (a); at the time when the adsorbent-catalyst (a) has been activated, stopping the introduction of secondary air from the first inlet; and, introducing secondary air from the second inlet while the hydrocarbons of exhaust gas adsorbed by the adsorbent component of the adsorbent-catalyst (a) are desorbed from the adsorbent component with the temperature rise of the adsorbent-catalyst (a) brought about by the heat of the exhaust gas.

According to the present invention, there is also provided a method for exhaust gas purification (a third purification method) by the use of a system for exhaust gas purification, which system comprises:

(a) an adsorbent-catalyst containing an adsorbent component capable of adsorbing hydrocarbons present in the exhaust gas emitted from an internal combustion engine and a catalyst component capable of reducing harmful substances present in the exhaust gas, provided in the exhaust pipe of the engine, (b) at least one catalyst containing a catalyst component capable of reducing the harmful substances, provided in the exhaust pipe at a site upstream of the adsorbent-catalyst (a) in the flow direction of the exhaust gas, (c) a first inlet for introduction of secondary air into exhaust gas, formed in the exhaust pipe at a site upstream of the most downstream catalyst of the catalyst(s) (b) in the flow direction of the exhaust gas, and (d) a second inlet for introduction of secondary air into exhaust gas, formed in the exhaust pipe at a site between the catalyst (b) and the adsorbent-catalyst (a), which method comprises introducing secondary air from the first inlet for a period from engine start to the activation of the catalyst (b); at the time when the catalyst (b) has been activated, stopping the introduction of secondary air from the first inlet; and, introducing secondary air from the second inlet while the hydrocarbons of exhaust gas adsorbed by the adsorbent component of the adsorbent-catalyst (a) are desorbed from the adsorbent component with the temperature rise of the adsorbent-catalyst (a) brought about by the heat of the exhaust gas.

According to the present invention, there is also provided a system for exhaust gas purification (a first purification system), comprising:

(a) an adsorbent containing an adsorbent component capable of adsorbing hydrocarbons present in the exhaust gas emitted from an internal combustion engine, provided in the exhaust pipe of the engine, (b) at least one catalyst containing a catalyst component capable of reducing harmful substances present in the exhaust gas, provided in the exhaust pipe at a site upstream of the adsorbent in the flow direction of the exhaust gas, (c) at least one catalyst containing a catalyst component capable of reducing harmful substances present in the exhaust gas, provided in the exhaust pipe at a site downstream of the adsorbent in the flow direction of the exhaust gas, (d) a first inlet for introduction of secondary air into exhaust gas, formed in the exhaust pipe at a site upstream of the most downstream catalyst of the catalyst (b), and (e) a second inlet for introduction of secondary air into exhaust gas, formed in the exhaust pipe at a site between the catalyst (b) and the most downstream catalyst of the catalyst (c).

According to the present invention, there is also provided a system for exhaust gas purification (a second purification system), comprising:

(a) an adsorbent-catalyst containing an adsorbent component capable of adsorbing hydrocarbons present in the exhaust gas emitted from an internal combustion engine and a catalyst component capable of reducing harmful substances present in the exhaust gas, provided in the exhaust pipe of the engine, (b) at least one catalyst containing a catalyst component capable of reducing the harmful substances, provided in the exhaust pipe at a site downstream of the adsorbent-catalyst (a) in the flow direction of the exhaust gas, (c) a first inlet for introduction of secondary air into exhaust gas, formed in the exhaust pipe at a site upstream of the adsorbent-catalyst (a) in the flow direction of the exhaust gas, and (d) a second inlet for introduction of secondary air into exhaust gas, formed in the exhaust pipe at a site between the adsorbent-catalyst (a) and the most downstream catalyst of the catalyst (b).

According to the present invention, there is also provided a system for exhaust gas purification (a third purification system), comprising:

(a) an adsorbent-catalyst containing an adsorbent component capable of adsorbing hydrocarbons present in the exhaust gas emitted from an internal combustion engine and a catalyst component capable of reducing harmful substances present in the exhaust gas, provided in the exhaust pipe of the engine, (b) at least one catalyst containing a catalyst component capable of reducing the harmful substances, provided in the exhaust pipe at a site upstream of the adsorbent-catalyst (a) in the flow direction of the exhaust gas, (c) a first inlet for introduction of secondary air into exhaust gas, formed in the exhaust pipe at a site upstream of the most downstream catalyst of the catalyst (b) in the flow direction of the exhaust gas, and (d) a second inlet for introduction of secondary air into exhaust gas, formed in the exhaust pipe at a site between the catalyst (b) and the adsorbent-catalyst (a).

In the present invention, "the catalyst component of the catalyst or the adsorbent-catalyst is activated" refers to a condition where the catalyst component of the catalyst or the adsorbent-catalyst is activated by the warm-up of engine and can convert (purify) the harmful substances present in exhaust gas, into non-harmful substances.

BRIEF DESCRIPTION OF THE DRAWINGS

FIG. 16 is a schematic drawing showing the system for exhaust gas purification used in Example 13.

FIG. 17 is a schematic drawing showing the system for exhaust gas purification used in Example 14.

FIG. 18 is a schematic drawing showing the system for exhaust gas purification used in Example 15.

FIG. 22 is a schematic drawing showing the system for exhaust gas purification used in Example 19.

FIG. 23 is a schematic drawing showing the system for exhaust gas purification used in Example 20.

FIG. 24 is a schematic drawing showing the system for exhaust gas purification used in Example 21.

FIG. 25 is a schematic drawing showing the system for exhaust gas purification used in Comparative Example 1.

FIG. 26 is a schematic drawing showing the system for exhaust gas purification used in Comparative Examples 2, 3 and 4.

FIG. 27 is a schematic drawing showing the system for exhaust gas purification used in Comparative Example 5.

FIG. 28 is a schematic drawing showing the system for exhaust gas purification used in Comparative Example 6.

FIG. 29 is a schematic drawing showing the system for exhaust gas purification used in Comparative Example 7.

DETAILED DESCRIPTION OF THE PREFERRED EMBODIMENT

Figure 1:
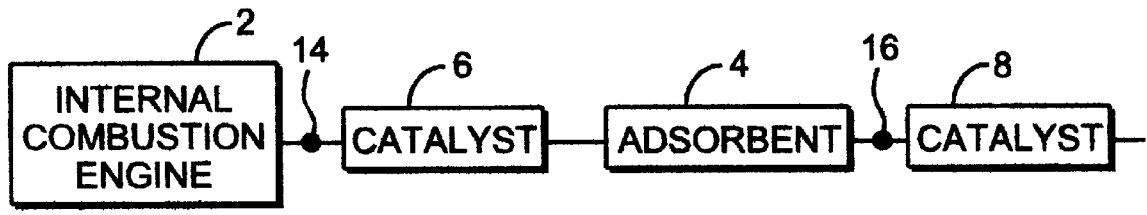
FIG. 1 is a schematic drawing showing an example of the system for exhaust gas purification (the first purification system) used in the method for exhaust gas purification (the first purification method) of the present invention.

Description is made first on the first purification method. As shown in the schematic drawing of FIG. 1, the system for exhaust gas purification (the first purification system) used in the first purification method comprises:

an adsorbent 4 containing an adsorbent component capable of adsorbing hydrocarbons present in the exhaust gas emitted from an internal combustion engine 2, provided in the exhaust pipe of the engine, a catalyst 6 containing a catalyst component capable of reducing harmful substances present in the exhaust gas, provided in the exhaust pipe at a site upstream of the adsorbent 4 in the flow direction of the exhaust gas, and a catalyst 8 containing a catalyst component capable of reducing harmful substances present in the exhaust gas, provided in the exhaust pipe at a site downstream of the adsorbent 4 in the flow direction of the exhaust gas. The first purification system further comprises:

a first inlet 14 for introduction of secondary air into exhaust gas, formed in the exhaust pipe at a site upstream of the catalyst 6 provided upstream of the adsorbent 4 (the catalyst 6 is hereinafter referred to as "upstream catalyst 6"), and a second inlet 16 for introduction of secondary air into exhaust gas, formed in the exhaust pipe at a site between the upstream catalyst 6 and the catalyst 8 provided downstream of the adsorbent 4 (the catalyst 8 is hereinafter referred to as "downstream catalyst 8").

In the first purification method using the above-mentioned first purification system, secondary air is introduced from the first inlet 14 into an exhaust gas to be purified, for a period from the start of the engine 2 to the activation of the upstream catalyst 6. This introduction of secondary air is conducted mainly for the promotion of the activation of the upstream catalyst 6. As mentioned previously, during the cold start of engine, an exhaust gas of fuel-rich composition is discharged, making difficult the combustion reaction of catalyst; however, by introducing secondary air to shift the composition of exhaust gas to a fuel-lean composition, the upstream catalyst 6 can be activated at an early time.

The introduction of secondary air from the first inlet 14 is stopped at a time when the upstream catalyst 6 has been activated. This is done in order to shift, at a time of cold start as early as possible, the exhaust gas from a fuel-lean composition (brought about by the introduction of secondary air) to a composition in which the upstream catalyst 6 can purify NOx. Even when the upstream catalyst 6 has been activated, the upstream catalyst 6 hardly gives rise to the purification reaction of NOx when the exhaust gas composition remains lean; therefore, the introduction of secondary air from the first inlet 14 is stopped to return the lean composition of the exhaust gas flowing into the upstream catalyst 6 (which has been activated), to a rich composition (a stoichiometric composition when the $O_2$ sensor for A/F control is already in feed-back operation).

Meanwhile, the HC discharged in a large amount during the cold start of the engine is once adsorbed by the adsorbent 4 of the system, and is desorbed from the adsorbent 4 with the temperature rise of the adsorbent 4 brought about by the heat of exhaust gas. The HC desorbed from the adsorbent 4

(this HC is hereinafter referred to as "desorbed HC") is purified mainly by the downstream catalyst 8. During the desorption of HC from the adsorbent 4, the HC concentration in the exhaust gas increases, resulting in a shortage of oxygen necessary for purification (combustion) of desorbed HC; therefore, during the period, secondary air is introduced from the second inlet 16 to supplement the oxygen used for purification of desorbed HC.

Thus, introduction of secondary air from the second inlet 16 is conducted mainly for the purification of desorbed HC. It is done at an exhaust pipe site downstream of the upstream catalyst 6. Therefore, the introduction of secondary air invites neither exposure of the upstream catalyst 6 to an exhaust gas of lean composition nor subsequent impairment of NOx purification.

As mentioned above, the fir st in let 14 for secondary air introduction conducted for promotion of catalyst activation and the second inlet 16 for secondary air introduction conducted for promotion of desorbed HC purification are formed at exhaust pipe sites upstream and downstream, respectively, of the upstream catalyst 6 intended for NOx purification; when the upstream catalyst 6 has been activated, the secondary air introduction from the first inlet 14 conducted for promotion of catalyst activation is stopped; thereby, HC can be effectively purified without sacrificing the purification of NOx.

In FIG. 1, the second inlet 16 is formed at an exhaust pipe site between the adsorbent 4 and the downstream catalyst 8. Since the site of the second inlet 16 can be any place upstream of the downstream catalyst 8 (having a role of purification of desorbed HC) but downstream of the upstream catalyst 6, the second inlet 16 may be formed between the upstream catalyst 6 and the adsorbent 4. Further, in the first purification method, a plurality of upstream catalysts or a plurality of downstream catalysts may be provided in the system.

When a plurality of upstream catalysts are provided, the first inlet is formed at a site upstream of the most downstream catalyst (closest to the adsorbent) of the upstream catalysts. When the first inlet is formed at an exhaust pipe site upstream of the most upstream catalyst of the upstream catalysts, superior low-temperature activation is obtained.

Meanwhile, when a plurality of downstream catalysts are provided, the second inlet is formed at a site upstream of the most downstream catalyst of the downstream catalysts. When the second inlet is formed at an exhaust pipe site upstream of the most upstream catalyst (closest to the adsorbent) of the downstream catalysts, more downstream catalysts can utilize the secondary air for promotion of desorbed HC purification.

In the first purification method, the adsorbent may contain, in addition to the adsorbent component having HC adsorbability, a catalyst component capable of reducing harmful substances of exhaust gas (the adsorbent containing such a catalyst component is hereinafter referred to as "adsorbent-catalyst").

In using an adsorbent-catalyst, when the second inlet is formed at an exhaust pipe site upstream of the adsorbent-catalyst, the HC desorbed from the adsorbent component of the adsorbent-catalyst is purified not only by the downstream catalyst but also by the catalyst component of the adsorbent-catalyst. When the second inlet is formed at an exhaust pipe site downstream of the adsorbent-catalyst, the NOx discharged during the cold start of engine is purified not only by the upstream catalyst but also by the catalyst component of the adsorbent-catalyst.

A plurality of adsorbents or a plurality of adsorbent-catalysts may be provided, or, an adsorbent and an adsorbent-catalyst may be used in combination. In that case, they may be provided in a series, or a catalyst may be provided between them. In the present method, in order to obtain an improved overall purification performance in the FTP, it is preferable to provide a catalyst having a certain capacity relative to the engine displacement, at an exhaust pipe site downstream of the present system using an adsorbent-catalyst(s) and/or an adsorbent(s).

Next, description is made on the second purification method. As shown in the schematic drawing of FIG. 2, the system for exhaust gas purification (the second purification system) used in the second purification method comprises:

an adsorbent-catalyst 10 containing an adsorbent component capable of adsorbing hydrocarbons present in the exhaust gas emitted from an internal combustion engine and a catalyst component capable of reducing harmful substances present in the exhaust gas, provided in the exhaust pipe of the engine, and a catalyst 12 containing a catalyst component capable of reducing the harmful substances, provided in the exhaust pipe at a site downstream of the adsorbent-catalyst 10 in the flow direction of the exhaust gas.

The second purification system further comprises:

a first inlet 14 for introduction of secondary air into exhaust gas, formed in the exhaust pipe at a site upstream of the adsorbent-catalyst 10 in the flow direction of the exhaust gas, and a second inlet 16 for introduction of secondary air into exhaust gas, formed in the exhaust pipe at a site between the adsorbent-catalyst 10 and the catalyst 12.

In the second purification method using the above purification system, first secondary air is introduced from the first inlet 14 into the exhaust gas discharged from the engine 2, for a period from the start of the engine 2 to the activation of the catalyst component of the adsorbent-catalyst 10. This introduction of secondary air is made mainly for the promotion of the activation of the catalyst component of the adsorbent-catalyst 10. The reason why the activation of the catalyst component of the adsorbent-catalyst 10 is promoted by the introduction of secondary air, is the same as in the case of the activation of the upstream catalyst 6 in the first purification method.

The introduction of secondary air from the first inlet 14 is stopped at a time when the catalyst component of the adsorbent-catalyst 10 has been activated. This is done in order to shift, at a time of cold start as early as possible, the exhaust gas from a fuel-lean composition (brought about by the introduction of secondary air) to a composition in which the catalyst component of the adsorbent-catalyst 10 can purify NOx.

Meanwhile, the HC discharged in a large amount during the cold start of engine is once adsorbed by the adsorbent component of the adsorbent-catalyst 10 of the system, and is desorbed from the adsorbent component with the temperature rise of the adsorbent-catalyst 10 brought about by the heat of exhaust gas. The desorbed HC is purified mainly by the catalyst 12 downstream of the adsorbent-catalyst 10. During the desorption of HC from the adsorbent component, the HC concentration in exhaust gas increases, resulting in a shortage of oxygen necessary for purification (combustion) of desorbed HC; therefore, during the period, secondary air is introduced from the second inlet 16 to supplement the oxygen used for purification of desorbed HC.

Introduction of secondary air from the second inlet 16 is done at an exhaust pipe site downstream of the adsorbent-catalyst 10. Therefore, the introduction of secondary air invites neither exposure of the catalyst component of the adsorbent-catalyst 10 to an exhaust gas of lean composition nor subsequent impairment of NOx purification.

As mentioned above, the first inlet 14 for secondary air introduction conducted for promotion of catalyst activation and the second inlet 16 for secondary air introduction conducted for promotion of desorbed HC purification are formed at exhaust pipe sites upstream and downstream, respectively, of the adsorbent-catalyst 10 containing a catalyst component intended for NOx purification; when the catalyst component of the adsorbent-catalyst 10 has been activated, the secondary air introduction from the first inlet 14 conducted for promotion of catalyst activation is stopped; thereby, HC can be effectively purified without sacrificing the purification of NOx.

Figure 2:
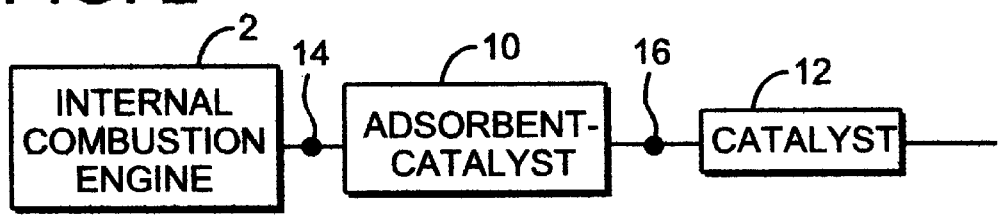
FIG. 2 is a schematic drawing showing an example of the system for exhaust gas purification (the second purification system) used in the method for exhaust gas purification (the second purification method) of the present invention.

In FIG. 2, one catalyst 12 is provided downstream of the adsorbent-catalyst 10, but it may be replaced by a plurality of catalysts. When a plurality of catalysts are provided, the second inlet is formed at a site upstream of the most downstream catalyst of the catalysts. When the second inlet is formed at an exhaust pipe site upstream of the most upstream catalyst (the catalyst closest to the adsorbent-catalyst 10) of the catalysts, the secondary air introduced from the second inlet can be used for promotion of desorbed HC purification by all the catalysts. When the second inlet is formed at an exhaust pipe site between the most upstream catalyst and the most downstream catalyst, the catalyst(s) upstream of the second inlet can conduct, together with the catalyst component of the adsorbent-catalyst, NOx purification from an early time of cold start.

Further in the second purification method, the adsorbent-catalyst 10 may be replaced by a plurality of adsorbent-catalysts in the system, or an adsorbent such as used in the first purification method may be used in combination with the adsorbent-catalyst 10. In that case, they may be provided in a series, or a catalyst may be provided between them. Further, in the second purification method, as in the first purification method, in order to obtain an improved overall purification performance in the FTP, it is preferable to provide a catalyst having a certain capacity relative to the engine displacement, at an exhaust pipe site downstream of the present system.

Next, description is made of the third purification method. As shown in the schematic drawing of FIG. 3, the system for exhaust gas purification (the third purification system) used in the third purification method comprises:

an adsorbent-catalyst 10 containing an adsorbent component capable of adsorbing hydrocarbons present in the exhaust gas emitted from an internal combustion engine and a catalyst component capable of reducing harmful substances present in the exhaust gas, provided in the exhaust pipe of the engine, and a catalyst 12 containing a catalyst component capable of reducing the harmful substances, provided in the exhaust pipe at a site upstream of the adsorbent-catalyst 10 in the flow direction of the exhaust gas.

The third purification system further comprises:

a first inlet 14 for introduction of secondary air into exhaust gas, formed in the exhaust pipe at a site upstream of the catalyst 12 in the flow direction of the exhaust gas, and a second inlet 16 for introduction of secondary air into exhaust gas, formed in the exhaust pipe at a site between the catalyst 12 and the adsorbent-catalyst 10.

In the third purification method using the above purification system, first secondary air is introduced from the first inlet 14 into the exhaust gas discharged from the engine 2, for a period from the start of the engine 2 to the activation of the catalyst 12. This introduction of secondary air is made mainly for the promotion of the activation of the catalyst 12. The reason why the activation of the catalyst 12 is promoted by the introduction of secondary air, is the same as in the case of the activation of the upstream catalyst 6 in the first purification method.

The introduction of secondary air from the first inlet 14 is stopped at a time when the catalyst 12 has been activated. This is done in order to shift, at a time of cold start as early as possible, the exhaust gas from a fuel-lean composition (brought about by the introduction of secondary air) to a composition in which the catalyst 12 can purify NOx.

Meanwhile, the HC discharged in a large amount during the cold start of the engine is once adsorbed by the adsorbent component of the adsorbent-catalyst 10 of the system, and is desorbed from the adsorbent component with the temperature rise of the adsorbent-catalyst 10 brought about by the heat of exhaust gas. The desorbed HC is purified mainly by the catalyst component of the adsorbent-catalyst 10. During the desorption of HC from the adsorbent component, the HC concentration in exhaust gas increases, resulting in a shortage of oxygen necessary for purification (combustion) of desorbed HC; therefore, during the period, secondary air is introduced from the second inlet 16 to supplement the oxygen used for purification of desorbed HC.

Introduction of secondary air from the second inlet 16 is done at an exhaust pipe site downstream of the catalyst 12. Therefore, the introduction of secondary air invites neither exposure of the catalyst 12 to an exhaust gas of lean composition nor subsequent impairment of NOx purification.

As mentioned above, the first inlet 14 for secondary air introduction conducted for promotion of catalyst activation and the second inlet 16 for secondary air introduction conducted for promotion of desorbed HC purification are formed at exhaust pipe sites upstream and downstream, respectively, of the catalyst 12 activated for NOx purification; when the catalyst 12 has been activated, the secondary air introduction from the first inlet 14 conducted for promotion of catalyst activation is stopped; thereby, HC can be effectively purified without sacrificing the purification of NOx.

Figure 3:
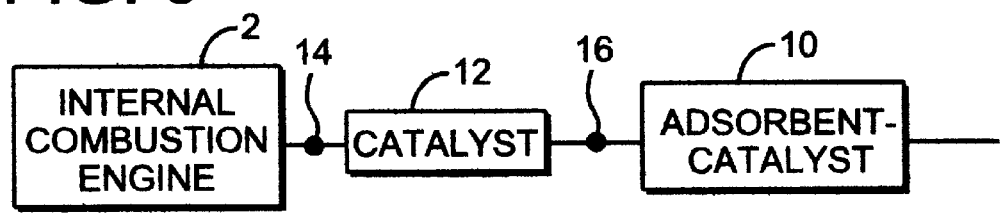
FIG. 3 is a schematic drawing showing an example of the system for exhaust gas purification (the third purification system) used in the method for exhaust gas purification (the third purification method) of the present invention.

In FIG. 3, one catalyst 12 is provided upstream of the adsorbent-catalyst 10, but it may be replaced by a plurality of catalysts. When a plurality of catalysts are provided, the first inlet is formed at a site upstream of the most downstream catalyst (the catalyst closest to the adsorbent-catalyst 10) of the catalysts. When the first inlet is formed at an exhaust pipe site upstream of the most upstream catalyst, the secondary air introduced from the second inlet can conduct the early activation of all the catalysts and consequent NOx purification. Further, when a plurality of catalysts are provided, the second inlet is formed at an exhaust pipe site between the catalyst downstream of but closest to the first inlet and the adsorbent-catalyst. As the second inlet is formed at the above site but as downstream as possible, more catalyst(s) can conduct NOx purification.

Further in the third purification method, the adsorbent-catalyst 10 may be replaced by a plurality of adsorbent-catalysts in the system, or an adsorbent such as used in the first purification method may be used in combination with the adsorbent-catalyst 10, at a site upstream thereof. In that case, they may be provided in a series, or a catalyst may be provided between them. Further, in the third purification method, as in the first purification method, in order to obtain an improved overall purification performance in the FTP, it is preferable to provide a catalyst having a certain capacity relative to the engine displacement, at an exhaust pipe site downstream of the present system.

Next, description is made in detail of the elements constituting the systems for exhaust gas purification (the first to third purification systems) used in the first to third purification methods. The catalyst, adsorbent and adsorbent-catalyst constituting the first to third purification systems are preferably those obtained by allowing a monolithic carrier to support thereon a catalyst component and/or an adsorbent component.

The monolithic carrier refers to a structure having passages (cells) surrounded by substantially uniform partition walls, which is generally called a honeycomb structure. As the material for the monolithic carrier, there are suitably used ceramic materials made of cordierite, mullite or the like; foil-shaped metallic materials made of a heat-resistant stainless steel (e.g. Fe—Cr—Al alloy); and metallic materials molded into a honeycomb structure by powder metallurgy.

The monolithic carrier has a cell density of preferably 6–1,500 cells/in.$^2$ (cpi$^2$) (0.9–233 cells/cm$^2$) and a partition wall thickness of preferably 50–2,000 $\mu$m. It is preferable to use a monolithic carrier of smaller weight per unit volume in the catalyst (for which early activation is required) than in the adsorbent or the adsorbent-catalyst (for which delayed HC desorption is required).

Preferably, the catalyst and the catalyst component of the adsorbent-catalyst contain at least one noble metal selected from Pt, Pd and Rh to effectively remove harmful substances (e.g. HC, CO and NOx) discharged from an engine.

The noble metal is used by being supported by a heat-resistant oxide (e.g. $Al_2O_3$, $SiO_2$, $TiO_2$ or $ZrO_2$) or a compound oxide thereof. Use of, in particular, $Al_2O_3$ having a specific surface area of 100 m$^2$/g or more is preferable because the noble metal is highly dispersed therein, resulting in improvement in low-temperature activation and heat resistance. Use of a heat-resistant oxide mixed with 5–30% by weight of an oxide (e.g. $CeO_2$, $La_2O_3$ or $CeO_2$—$ZrO_2$) having oxygen storability is particularly preferable because an improved steady-state activity is obtained.

Of the above-mentioned noble metals, Rh is very effective for purification of NOx. Therefore, Rh is preferably contained in the catalyst and/or the catalyst component of the adsorbent-catalyst provided between the first inlet and the second inlet (the catalyst and the catalyst component, when the introduction of secondary air from the first inlet has been stopped, are released from a lean atmosphere and expected to start NOx purification). The amount of Rh supported is 2–30 g per ft$^3$ of monolithic carrier.

Also preferably, the catalyst and/or the catalyst component of the adsorbent-catalyst contains Pd which is effective for low-temperature activation. As to the amount of Pd supported, 40–300 g/ft$^3$ is preferable and, in view of the dispersibility of Pd, 40–200 g/ft$^3$ is more preferable.

When both Rh and Pd are supported by the catalyst and/or the adsorbent-catalyst both provided between the first inlet and the second inlet, Rh and Pd are supported separately by a heat-resistant oxide in view of the easiness of their alloying with each other and then the two resulting materials are coated on a monolithic carrier in a mixed state, preferably in a layered state. When the latter approach (coated in a layered state) is taken, Rh (which is expensive and used in a small amount) is contained preferably in an upper layer for effective utilization. Also when a combination of noble metals other than Rh/Pd are used, it is preferable that they are basically supported separately by a heat-resistant oxide and that the resulting two materials are coated on a monolithic carrier in a layered state.

As to the catalyst and/or the adsorbent-catalyst both provided downstream of the second inlet and having a role of purifying the desorbed HC, it is preferable that Pd and/or Pt (both being effective for HC purification) is supported by them.

In that case, the total amount of noble metal(s) supported by the catalyst and/or the adsorbent-catalyst is preferably 10–130 g/ft$^3$.

In the present invention, the catalyst and the catalyst component of the adsorbent-catalyst may contain, as ) an electron-donating substance, at least one element selected from the group consisting of alkali metals, alkaline earth metals, rare earth elements, transition metals and actinide elements; an oxide thereof; or a compound oxide containing at least one of the above elements. Specific examples of the above elements are Li, Cs, Mg, Ca, Sr, Ba, Y, Ti, Zr, Hf, La, Ce, Pr, Nd, Th and U. When the catalyst and the catalyst component of the adsorbent-catalyst contain the above element or oxide, a higher effect for promotion of low-temperature activation is obtained.

The adsorbent component used in the adsorbent or the adsorbent-catalyst includes zeolite, active carbon, etc. The adsorbent component must have a heat resistance of at least 500° C. for use in an exhaust gas system, and is preferably composed mainly of zeolite. Zeolite may be either of a natural product or a synthetic product, and has no particular restriction as to the kind. However, zeolite having a Si/Al molar ratio of 40 or more is preferably used in view of the heat resistance, durability and hydrophobicity. Specific examples of such zeolite are preferably ZSM-5, USY, β-zeolite, silicalite and a metallosilicate.

Zeolite can be used in one kind or in a combination of two or more kinds. ZSM-5 having relatively small pores of about 0.55 nm in diameter is advantageous for adsorption of small molecules (e.g. propene) but disadvantageous for adsorption of large molecules (e.g. toluene and xylene). Meanwhile, USY having relatively large pores of about 0.74 nm in diameter is disadvantageous for adsorption of small molecules (e.g. propene) but advantageous for adsorption of large molecules (e.g. toluene and xylene).

Therefore, coating of a mixture of ZSM-5 and USY on a monolithic carrier is a preferred method of using zeolite. Alternatively, ZSM-5 and USY may be supported on a monolithic carrier separately in the flow direction of exhaust gas. In this case, ZSM-5 is preferably supported on the upstream side of the carrier because ZSM-5 can adsorb and store HC up to a relatively high temperature of 150° C. β-Zeolite is preferred as well because it has bimodal pores of about 0.55 nm and about 0.70 nm and can adsorb both small molecules and large molecules relatively well.

While zeolite can be used as an adsorbent component as it is, it is preferred to allow zeolite to support at least one noble metal selected from Pt, Pd and Rh because the noble metal supported on zeolite can suppress coking of HC appearing simultaneously with adsorption of HC by zeolite. Support of noble metal on zeolite allows for regeneration of zeolite without reduction in its adsorbability for HC.

The noble metal supported on zeolite is preferably Pd because Pd is most inexpensive and can regenerate zeolite most efficiently. The support of noble metal is preferably conducted by an ion exchange method in view of the thermal stability. The amount of the noble metal supported is preferably 5–40 g per ft$^3$ of monolithic carrier, in view of the cost and the efficiency of zeolite regeneration. When zeolite is supported on a monolithic carrier, zeolite may contain, as necessary, 5–20% by weight of an inorganic binder (e.g. $Al_2O_3$ or $SiO_2$), whereby zeolite can be supported on the monolithic carrier strongly without impairing the adsorbability for HC.

The noble metal supported on zeolite for suppression of coking of HC has not only regeneratability for zeolite but also catalytic activity. The noble metal in zeolite, however, causes cohesion easily and has no sufficient catalytic durability; therefore, when an adsorbent-catalyst is produced, it is preferable to (1) allow an adsorbent layer made of zeolite to contain a catalyst component comprising (a) a heat-resistant oxide (same as used in the catalyst) and (b) a noble metal supported thereon, or (2) form, on the above adsorbent layer, a catalyst layer containing the above catalyst component.

Such an adsorbent-catalyst contains a catalyst component of sufficient durability and accordingly can show satisfactory purification ability even during the steady-state operation of engine after cold start. Since the catalyst component also can suppress the coking of zeolite, it is not necessary to newly add, into zeolite, a noble metal intended for suppression of coking.

It is also preferable to allow zeolite to contain at least one ion selected from the ions of IB group elements (cu, Ag and Au) of the periodic table because the ion can improve the HC adsorbability of zeolite. In this case, the content of the ion in zeolite is preferably at least 20%, more preferably at least 40% based on the Al atoms in zeolite, because with too small a content of the ion, the improvement of HC adsorbability is low. The ion may be contained in zeolite in any desired combination with the above-mentioned noble metal.

It is also desirable to allow zeolite to contain, in addition to the ion of IB group element, at least one of the ions of Mg, Ca, Sr, Ba, Y, La, Ti, Ce, Mn, Fe, Cr, Ni and Zn, preferably at least one of the ions of Mg, Ca, Fe and Cr, because the ion can improve the heat resistance of zeolite.

As one preferable example of the adsorbent-catalyst comprising an adsorbent layer and a catalyst layer formed thereon, there can be mentioned a multilayered adsorbent-catalyst obtained by forming, on a monolithic carrier, a first layer consisting of a high-silica zeolite (e.g. ZSM-5, USY or β-zeolite) supporting thereon a noble metal, and then forming thereon a second layer consisting of an $Al_2O_3$—$CeO_2$ compound oxide or an $Al_2O_3/CeO_2$ mixture, both supporting thereon a noble metal.

In the above multilayered adsorbent-catalyst, $Al_2O_3$ (a main component of the second layer) selectively adsorbs the $H_2O$ present in the exhaust gas emitted during engine cold start and functions as a predrier, whereby the HC adsorbability of the first layer is increased. In addition, with the temperature rise of exhaust gas, the adsorbent-catalyst is heated starting from the second layer (surface layer) containing a catalyst component, and this catalyst component of the second layer acts favorably at a time when the zeolite component of the first layer desorbs the adsorbed HC. At this time of the desorption of adsorbed HC, secondary air is introduced and oxygen is supplemented, whereby the catalytic activity of the second layer increases remarkably.

Even when the catalyst component supporting a noble metal thereon and the zeolite component are supported on a monolithic carrier in a mixed state and not in layers, the resulting adsorbent-catalyst functions relatively well. The weight ratio of the zeolite component and the catalyst component is 50–85:15–50. The weight proportion of the zeolite component is preferably larger than that of the catalyst component. A preferred amount supported on monolithic carrier is 0.05–0.40 g/cc (the zeolite component) and 0.02–0.20 g/cc (the catalyst component).

Preferably, at least one blowing-through hole having a diameter larger than that of the passages of monolithic carrier is formed in the adsorbent or the adsorbent-catalyst so that part of the exhaust gas can blow through the hole. Thereby, the warming of the catalyst provided downstream of the adsorbent or the adsorbent-catalyst is promoted and the efficiency of desorbed HC purification is improved. However, the formation of at least one blowing-through hole is not preferable when the adsorbent-catalyst is provided at the most downstream location. The diameter of the blowing-through hole is preferably 50 mm or less. It is more preferably 40 mm or less to prevent the excessive reduction in amount of HC adsorbed, caused by excessive blowing-through of exhaust gas. When the diameter is too small, the downstream catalyst is not sufficiently warmed; therefore, the diameter is preferably 10 mm or more.

There is no particular restriction as to the relative sizes of the adsorbent or the adsorbent-catalyst and the catalyst. However, the catalyst (which must have early activatability) is preferably smaller than the adsorbent or the adsorbent-catalyst (both must have delayed HC desorbability).

In the present invention, it is also preferable that at least one electrical heater (hereinafter referred to as "EH") is provided in the exhaust pipe in order to ensure the early activation of the catalyst or the catalyst component of the adsorbent-catalyst. Preferably, EH comprises (a) a honeycomb structure made of a heat-resistant metallic substance (e.g. ferrite) and (b) electrodes fixed thereto for electrification of the honeycomb structure, in view of the pressure loss and heat resistance. A more preferable form of EH is an electrically-heated catalyst (hereinafter referred to as "EHC") comprising EH and a catalyst layer made of a heat-resistant inorganic oxide containing a noble metal, formed on EH, because the quantity of electricity required for heating of EH can be smaller owing to the reaction heat generated by the catalyst layer.

In one preferable use of EHC, EHC is provided downstream of the adsorbent or the adsorbent-catalyst to promote the purification of desorbed HC. When EHC has a small size, a catalyst is preferably provided downstream of and close to EHC, to effectively utilize the heat produced by the heater of EHC and the reaction heat generated by the catalyst layer of EHC.

In the present invention, the position of the first inlet for introduction of secondary air is preferably close to the engine. It is because in this position, the secondary air introduced from the first inlet is easily heated and can prevent the cooling of the catalyst (provided downstream of the first inlet) by secondary air. However, when an $O_2$ sensor for A/F ratio control is provided in the exhaust gas system, the position of the first inlet is preferably downstream of the sensor so that the sensing by the sensor is not influenced.

In the first purification system used in the first purification method, the position of the second inlet may be upstream or downstream of the adsorbent for the purpose of "feeding oxygen necessary for purification of desorbed HC". However, upstream of the adsorbent is preferred because the secondary air introduced from the second inlet can be utilized for the cooling of the adsorbent.

The second inlet, which is provided in the middle of the purification system, may be formed by making a hole in the casing used for connecting the catalyst with the adsorbent or the adsorbent-catalyst or connecting the two consecutive catalysts in some cases. However, a nozzle of rod shape, ring shape or other shape is preferably used in place of the hole so that secondary air can be fed to the downstream adsorbent or the downstream adsorbent-catalyst (the downstream catalyst in some cases) as uniformly as possible in the cross-sectional direction thereof.

Next, description is made in detail on the timing of start or stoppage of secondary air introduction, the method for secondary air introduction, the amount of secondary air introduced, etc. used in the first to third purification methods. The start of secondary air introduction from the first inlet can be substantially simultaneous with engine start, in view of the intended purpose of "promoting the activation of the catalyst and/or the catalyst component of the adsorbent-catalyst".

The stoppage of secondary air introduction from the first inlet is made substantially simultaneous with the activation of the catalyst or the catalyst component of the adsorbent-catalyst, downstream of and closest to the first inlet. This timing of stoppage need not be exactly identical with the activation timing and can have a certain time span as long as the above purpose is not impaired. Determination of stoppage timing can be made, in the first and third purification methods, by providing a detecting means (e.g. HC sensor) downstream of the catalyst downstream of and closest to the first inlet, detecting the activation of the catalyst from the output of the detector, and determining stoppage timing based on the information. In this determination, however, a certain time is required in order for the sensor to be heated; therefore, it is preferable that a mechanism for secondary air introduction is actuated in accordance with a program (prepared in advance) for avoiding the fuel-rich state appearing during engine cold start. The latter approach is effective also for the second purification method.

When an $O_2$ sensor for A/F ratio control is provided between the engine and the purification system, the timing of stoppage of secondary air introduction from the first inlet can be made substantially identical with the timing when the sensor is actuated with the warm-up of engine and the engine is operated at a stoichiometric air/fuel ratio. This timing is 20–80 seconds from engine cranking in the case of an $O_2$ sensor provided with a heater, and 40–140 seconds from engine cranking in the case of an $O_2$ sensor provided with no heater.

The amount of secondary air introduced from the first inlet is preferably such that the exhaust gas sent to the catalyst or the adsorbent-catalyst downstream of and closest to the first inlet can have a composition containing oxygen at a stoichiometric or higher ratio.

The introduction of secondary air from the second inlet is made during the period in which HC is desorbed from the adsorbent or the adsorbent component of the adsorbent-catalyst, for the purpose of "feeding the oxygen necessary for purifying (burning) the HC desorbed from the adsorbent or the adsorbent component of the adsorbent-catalyst, by the catalyst component of the adsorbent-catalyst or the downstream catalyst". The timing of secondary air introduction from the second inlet is determined preferably by using a detecting means (e.g. $O_2$ sensor or HC sensor) provided downstream of the adsorbent-catalyst or the adsorbent. Alternatively, the timing is determined by measuring the temperature of the adsorbent or the adsorbent-catalyst.

In general, HC desorption starts when the temperature of the adsorbent or the adsorbent-catalyst has exceeded 80–100° C. Therefore, introduction of secondary air starts between engine cranking and 50 seconds later and is stopped when about 40–300 seconds have passed from engine cranking, although these timings differ depending upon the position, heat capacity, etc. of adsorbent or adsorbent-catalyst, or the operational condition of engine. The timings of start and stoppage of secondary air introduction from the second inlet, similarly to those from the first inlet, can each have a certain time span as long as the above-mentioned purpose of secondary air introduction is not impaired.

The amount of secondary air introduced from the second inlet is preferably such that the exhaust gas sent to the adsorbent-catalyst or the catalyst both downstream of the second inlet can have a composition containing oxygen at a stoichiometric or higher ratio. The amount of secondary air introduced may be controlled by feeding back an output from a detecting means.

The specific amount of secondary air introduced from the first inlet or the second inlet is about 20–300 l/mi n although it varies depending upon the displacement of engine. Since introduction of secondary air in an amount more than necessary leads to the cooling of the catalyst or the catalyst component of the adsorbent-catalyst, introduction is made most preferably in such an amount that the air/fuel ratio becomes about stoichiometric. The amount of secondary air introduced may be constant or may be varied appropriately.

The relation between the timing of stoppage of secondary air introduction from the first inlet and the timing of start of secondary air introduction from the second inlet can be either of the followings (1) to (3).

(1) The timing of stoppage of secondary air introduction from the first inlet is identical with the timing of start of secondary air introduction from the second inlet.

(2) The timing of stoppage of secondary air introduction from the first inlet is earlier than the timing of start of secondary air introduction from the second inlet.

(3) The timing of stoppage of secondary air introduction from the first inlet is later than the timing of start of secondary air introduction from the second inlet. Of the above, the relation (1) is relatively simple to adopt and is preferred.

In the present invention, secondary air can be replaced by other oxidizing gas (e.g. ozone or $O_2$). However, secondary air is most preferred in view of the easy introduction by a simple apparatus such as air pump or the like.

EXAMPLES

The present invention is hereinafter described in detail by way of Examples. However, the present invention is not restricted to these Examples.

[Production of catalysts]

Commercial $\gamma$-$Al_2O_3$ having a specific surface area of 200 $m^2$/g was immersed in each of an aqueous $H_2PtCl_6$ solution, an aqueous $Pd(NO_3)_2$ solution and an aqueous $Rh(NO_3)_3$ solution, followed by drying and 500° C. firing, to obtain a Pt-supported $Al_2O_3$ powder, a Pd-supported $Al_2O_3$ powder and a Rh-supported $Al_2O_3$ powder. To each of these noble metal-supported $Al_2O_3$ powders were added appropriate amounts of water and acetic acid. To each of the Pt-supported $Al_2O_3$ powder and the Pd-supported $Al_2O_3$ powder was also added 30% by weight of a $CeO_2$ powder. Each of the resulting mixtures was subjected to wet pulverization to prepare three kinds of slurries to be coated. The thus-prepared Pt—$Al_2O_3$.$CeO_2$ slurry, Pd—$Al_2O_3$.$CeO_2$ slurry and Rh—$Al_2O_3$ slurry were coated singly or in combination of two slurries (in this case, two slurries were coated in two consecutive layers), on a cordierite monolithic carrier (a product of NGK Insulators, Ltd.) having a partition wall thickness of 6 mil and a cell density of 400 cells/$cpi^2$. Each of the coated carriers was fired at 500° C. to obtain various catalysts shown in Table 1.

TABLE 1

| | Kind of noble metal supported | Amount of noble metal supported (g/ft³) (*1) | Diameter of monolithic carrier (in.) | Volume of monolithic carrier (l) |
|---|---|---|---|---|
| Catalyst a1 | Inner layer : Pd<br>Surface layer : Rh | 150<br>10 | 3.66 | 0.3 |
| Catalyst a2 | Inner layer : Pd<br>Surface layer : Rh | 150<br>10 | 3.66 | 0.6 |
| Catalyst a3 | Inner layer : Pd<br>Surface layer : Rh | 150<br>10 | 3.66 | 0.7 |
| Catalyst a4 | Inner layer : Pd<br>Surface layer : Rh | 150<br>10 | 3.66 | 0.9 |
| Catalyst a5 | Inner layer : Pd<br>Surface layer : Rh | 150<br>10 | 3.66 | 1.0 |
| Catalyst a6 | Inner layer : Pd<br>Surface layer : Rh | 150<br>10 | 3.66 | 1.2 |
| Catalyst b1 | Pd | 150 | 3.66 | 0.3 |
| Catalyst b2 | Pd | 150 | 3.66 | 0.6 |
| Catalyst b3 | Pd | 150 | 3.66 | 0.7 |
| Catalyst b4 | Pd | 150 | 3.66 | 0.9 |
| Catalyst b5 | Pd | 150 | 3.66 | 1.0 |
| Catalyst b6 | Pd | 150 | 3.66 | 1.2 |
| Catalyst c1 | Rh | 10 | 3.66 | 0.3 |
| Catalyst d1 | Inner layer : Pt<br>Surface layer : Rh | 40<br>10 | 3.66 | 1.0 |
| Catalyst d2 | Inner layer : Pt<br>Surface layer : Rh | 40<br>10 | 4.66 | 1.7 |

(*1): Amount of noble metal supported per unit volume of monolithic carrier

[Production of adsorbents]

Appropriate amounts of water and acetic acid were added to a commercial β-zeolite powder. Thereto was added 5% by weight (as oxide) of an $Al_2O_3$ sol. The resulting mixture was subjected to wet pulverization to obtain a slurry to be coated. Separately, in a cordierite monolithic carrier (a product of NGK Insulators, Ltd.) having a partition wall thickness of 12 mil and a cell density of 300 cells/cpi² was formed a hole by gouging the cylindrical portion of the carrier of 25 mm in diameter whose central axis was identical with that of the carrier and which extended in the axial direction of the passages (cells) of the carrier, whereby a monolithic carrier having a blowing-through hole was produced. On this monolithic carrier was coated the above-produced slurry, followed by firing at 500° C., to obtain two adsorbents e1 and e2.

TABLE 2

| | Layer formed by coating | Dia. of monolithic carrier (in.) | Vol. of monolithic carrier (l) | Blowing-through hole |
|---|---|---|---|---|
| Adsorbent e1 | β-Zeolite | 4.66 | 0.5 | Yes |
| Adsorbent e2 | β-Zeolite | 4.66 | 1.5 | Yes |

[Production of adsorbent-catalysts]

Appropriate amounts of water and acetic acid were added to a commercial β-zeolite powder. Thereto was added 5% by weight (as oxide) of an $Al_2O_3$ sol. The resulting mixture was subjected to wet pulverization to obtain a slurry to be coated. The slurry was coated on a cordierite monolithic carrier (a product of NGK Insulators, Ltd.) having a partition wall thickness of 12 mil and a cell density of 300 cells/cpi².

The coated carrier was fired at 500° C. Thereon was coated the same Pd—$Al_2O_3$.$CeO_2$ slurry as used in the above "Production of catalysts", followed by firing at 500° C., to obtain adsorbent-catalysts f1, f2 and f3 shown in Table 3. Incidentally, in each of the adsorbent-catalysts f1 and f2, a blowing-through hole was formed in the monolithic carrier before slurry coating, in the same manner as in the above "Production of adsorbents". On each of the adsorbent-catalysts f2 and f3 was coated the same Rh—$Al_2O_3$ slurry as used in the above "Production of catalysts", followed by firing at 500° C., to obtain adsorbent-catalysts g1 and g2 shown in Table 3.

TABLE 3

| | Layer formed by coating | Diameter of monolithic carrier (in.) | Volume of monolithic carrier (l) | Blowing-through hole |
|---|---|---|---|---|
| Adsorbent Catalyst f1 | Inner layer: β-zeolite<br>Surface layer:<br>Pd-$Al_2O_3$ · $CeO_2$ | 4.66 | 1.0 | Yes |
| Adsorbent Catalyst f2 | Inner layer: β-zeolite<br>Surface layer:<br>Pd-$Al_2O_3$ · $CeO_2$ | 4.66 | 1.5 | Yes |
| Adsorbent Catalyst f3 | Inner layer: β-zeolite<br>Surface layer:<br>Pd-$Al_2O_3$ . $CeO_2$ | 4.66 | 1.5 | No |
| Adsorbent Catalyst g1 | Inner layer: β-zeolite<br>Intermediate layer:<br>Pd-$Al_2O_3$ · $CeO_2$<br>Surface layer:<br>Rh-$Al_2O_3$ | 4.66 | 1.5 | Yes |
| Adsorbent Catalyst g2 | Inner layer: β-zeolite<br>Intermediate layer:<br>Pd-$Al_2O_3$ · $CeO_2$<br>Surface layer:<br>Rh-$Al_2O_3$ | 4.66 | 1.5 | No |

[Production of electrically-heated catalyst (EHC)]

There were mixed a Fe powder, a Cr-30Al powder (wt. %), a Fe-50Al powder (wt. %), a Fe-20B powder (wt. %) and an $Y_2O_3$ powder (all having an average particle diameter of 44 μm or less) so as to give a composition of Fe-18Cr-8Al-0.05B-0.5$Y_2O_3$ (wt. %). The resulting mixture was mixed with 4 g (per 100 g of the mixture) of methyl cellulose (as an organic binder) and 1 g (on the same basis) of oleic acid (as an oxidation inhibitor). The resulting readily formable bullet was subjected to extrusion molding to obtain a columnar honeycomb material. The honeycomb material was dried at 90° C. for 16 hours in air and then kept at 1,325° C. for 2 hours in a hydrogen atmosphere for sintering. The sintered material was heat-treated at 1,150° C. for 30 minutes in air to obtain a honeycomb structure. The honeycomb structure had a porosity of 3%.

Figure 30:
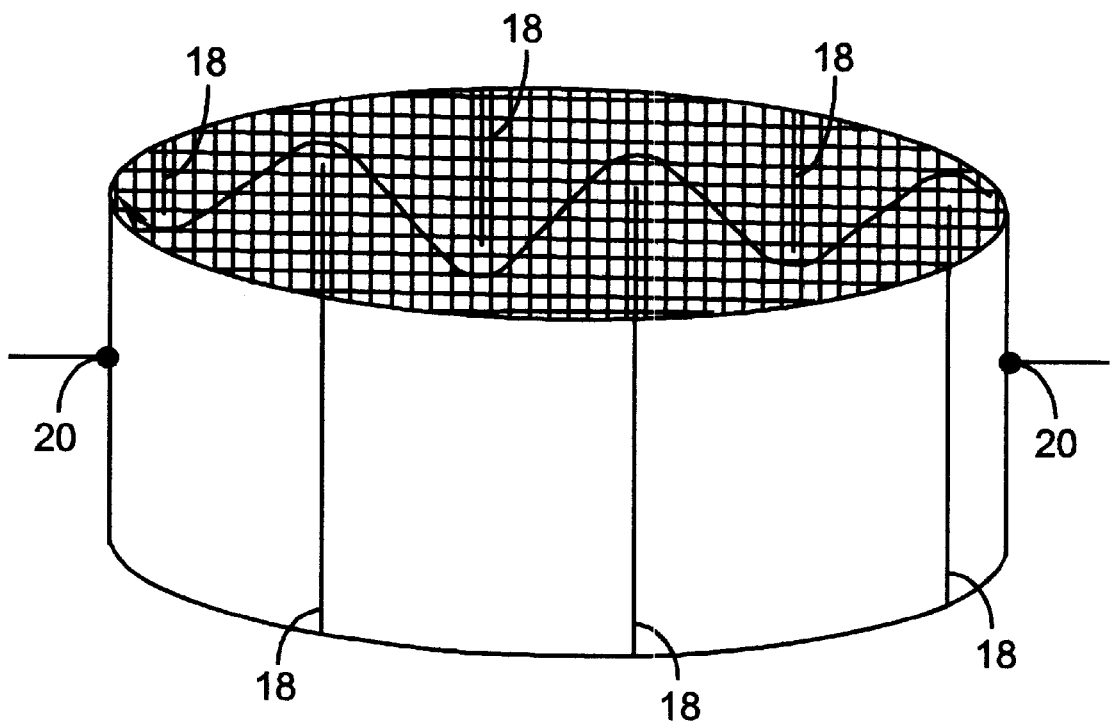
FIG. 30 is a drawing showing an example of the electrically-heated catalyst used in the present invention.

The thus-obtained honeycomb structure having an outer diameter of 93 mm, a thickness of 25 mm, a partition wall thickness of 0.1 mm and a cell (square cell) density of 450 cpi² was subjected to grinding to form, as shown in FIG. 30, six slits 18 in a direction parallel to the axes of the passages of the honeycomb structure so that the number of cells between two adjacent slits became seven and the honeycomb structure after slits formation had an electrical resistance of 50 mΩ. Next, on the honeycomb structure was coated the same Pd—$Al_2O_3$.$CeO_2$ slurry as used in the above "Production of catalysts", followed by firing at 500° C., to form a catalyst layer so that the amount of Pd supported became 150 g/ft³. The resulting material was provided with electrodes 20 and placed in a SUS-made casing with a distance for insulation being taken between the casing and the material, to complete an electrically-heated catalyst (EHC). This EHC had an effective volume of 0.13 l.

[Constitution of exhaust gas purification systems]

In the exhaust gas line of an actual engine was set any of the above-obtained catalysts, adsorbents, adsorbent-catalysts and electrically-heated catalyst (EHC) so that the exhaust gas temperature at the gas inlet became 850° C.; and the engine was operated for 60 seconds at an A/F ratio close to the stoichiometric ratio (14.4). Then, fuel feeding was cut for 5 seconds to shift the A/F ratio to a lean fuel side. In this engine operational mode including the above fuel-cutting, each material was subjected to aging for total 100 hours. Using the materials (i.e. catalysts, adsorbents, adsorbent-catalysts and electrically-heated catalyst) after aging, exhaust gas purification systems shown below were constituted. Incidentally, each numeral shown in FIGS. 4 to 29 was shown in the following description of each system by adding parenthesis to the numeral to avoid confusion between the symbols indicating the kinds of catalysts, adsorbents and adsorbent-catalysts and the numerals used in FIGS. 4 to 29.

(System I)

Figure 4:
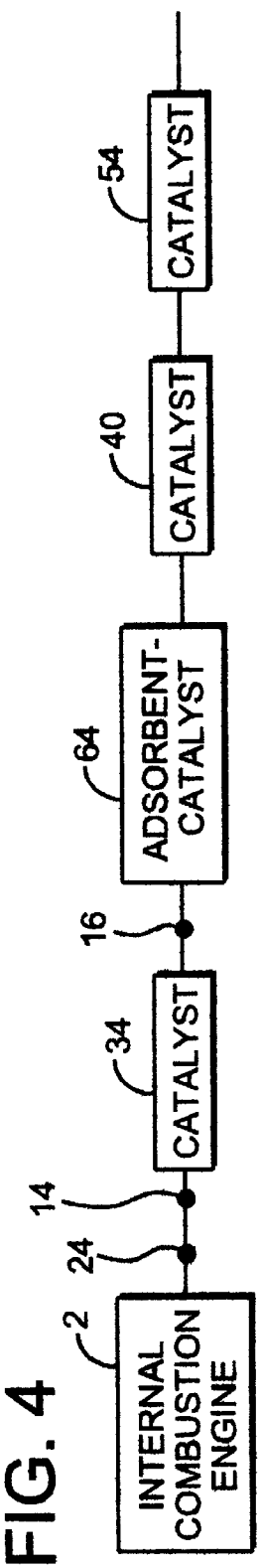
FIG. 4 is a schematic drawing showing the system for exhaust gas purification used in Example 1.

As shown in FIG. 4, in the exhaust gas line of an engine (2) were provided a catalyst a5 (34), an adsorbent-catalyst f3 (64), a catalyst b2 (40) and a catalyst d2 (54) in this order from the engine (2) side. Between the engine (2) and the catalyst a5 (34) were provided an $O_2$ sensor (24) for A/F ratio control at an upstream side and a first inlet (14) for secondary air introduction at a downstream side. Between the catalyst a5 (34) and the adsorbent-catalyst f3 (64) was provided a second inlet (16) for secondary air introduction. The distance between the engine exhaust port and the catalyst a5 (34) was 1,000 mm; and the distances between the catalyst a5 (34) and the adsorbent-catalyst f3 (64), between the adsorbent-catalyst f3 (64) and the catalyst b2 (40) and between the catalyst b2 (40) and the catalyst d2 (54) were each 70 mm.

(System II)

Figure 5:
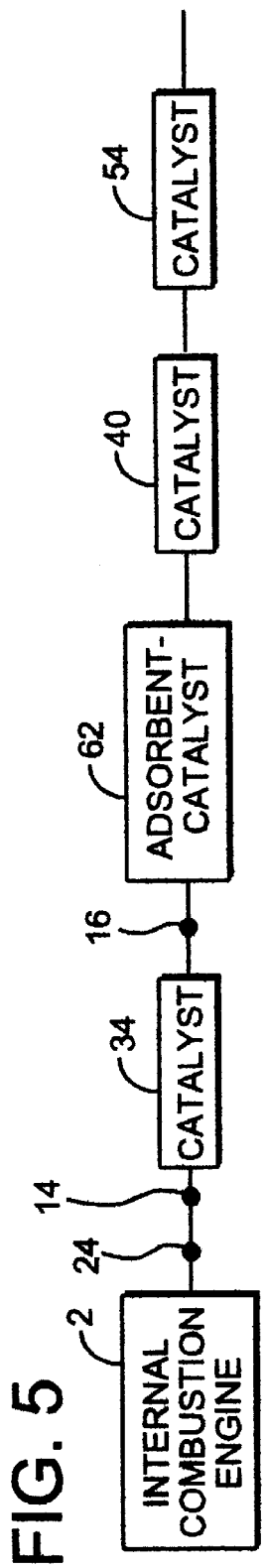
FIG. 5 is a schematic drawing showing the system for exhaust gas purification used in Examples 2, 22, 24, 25, 26 and 27.

As shown in FIG. 5, a system II was constituted in the same manner as in the case of the system I except that the adsorbent-catalyst f3 (64) of the system I was replaced by an adsorbent-catalyst f2 (62).

(System III)

Figure 6:
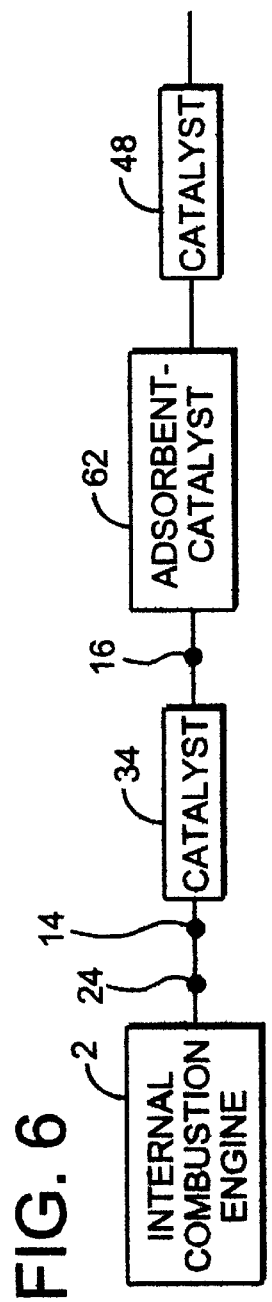
FIG. 6 is a schematic drawing showing the system for exhaust gas purification used in Example 3.

As shown in FIG. 6, in the exhaust gas line of an engine (2) were provided a catalyst a5 (34), an adsorbent-catalyst f2 (62) and a catalyst b6 (48) in this order from the engine (2) side. Between the engine (2) and the catalyst a5 (34) were provided an $O_2$ sensor (24) for A/F ratio control at an upstream side and a first inlet (14) for secondary air introduction at a downstream side. Between the catalyst a5 (34) and the adsorbent-catalyst f2 (62) was provided a second inlet (16) for secondary air introduction. The distance between the engine exhaust port and the catalyst a5 (34) was 1,000 mm; and the distances between the catalyst a5 (34) and the adsorbent-catalyst f2 (62) and between the adsorbent-catalyst f2 (62) and the catalyst b6 (48) were each 70 mm.

(System IV)

Figure 7:
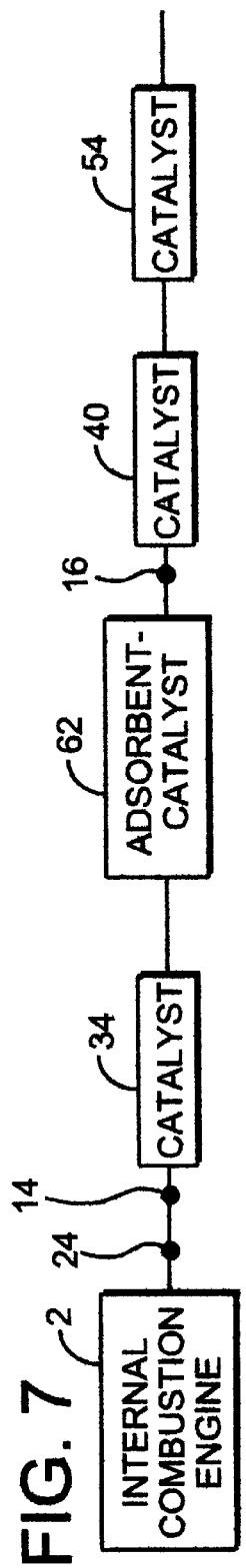
FIG. 7 is a schematic drawing showing the system for exhaust gas purification used in Example 4.

As shown in FIG. 7, a system IV was constituted in the same manner as in the case of the system II except that a second inlet (16) was provided between the adsorbent-catalyst f2 (62) and the catalyst b2 (40).

(System V)

Figure 8:
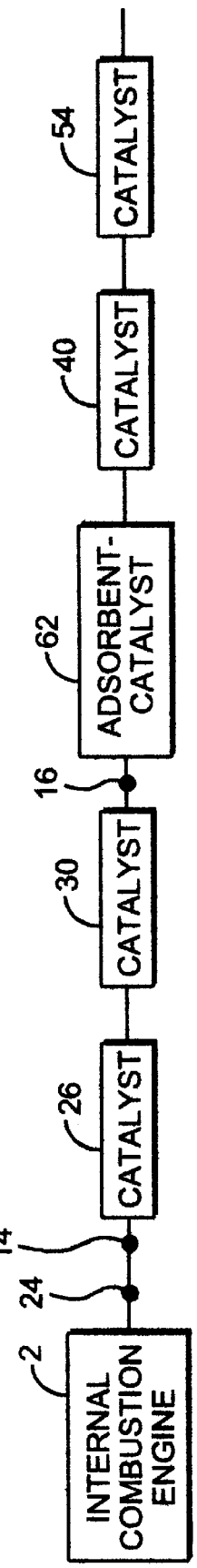
FIG. 8 is a schematic drawing showing the system for exhaust gas purification used in Example 5.

As shown in FIG. 8, in the exhaust gas line of an engine (2) were provided a catalyst a1 (26), a catalyst a3 (30), an adsorbent-catalyst f2 (62), a catalyst b2 (40) and a catalyst d2 (54) in this order from the engine (2) side. Between the engine (2) and the catalyst a1 (26) were provided an $O_2$ sensor (24) for A/F ratio control at an upstream side and a first inlet (14) for secondary air introduction at a downstream side. Between the catalyst a3 (30) and the adsorbent-catalyst f2 (62) was provided a second inlet (16) for secondary air introduction. The distance between the engine exhaust port and the catalyst a1 (26) was 1,000 mm; and the distances between the catalyst a1 (26) and the catalyst a3 (30), between the catalyst a3 (30) and the adsorbent-catalyst f2 (62), between the adsorbent-catalyst f2 (62) and the catalyst b2 (40) and between the catalyst b2 (40) and the catalyst d2 (54) were each 70 mm.

(System VI)

Figure 9:
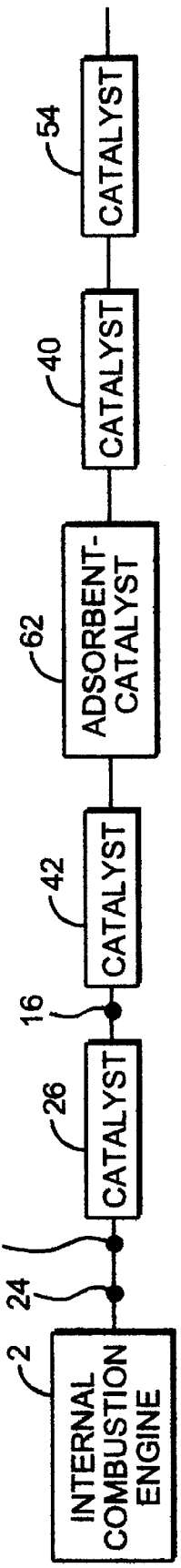
FIG. 9 is a schematic drawing showing the system for exhaust gas purification used in Example 6.

As shown in FIG. 9, in the exhaust gas line of an engine (2) were provided a catalyst a1 (26), a catalyst b3 (42), an adsorbent-catalyst f2 (62), a catalyst b2 (40) and a catalyst d2 (54) in this order from the engine (2) side. Between the engine (2) and the catalyst a1 (26) were provided an $O_2$ sensor (24) for A/F ratio control at an upstream side and a first inlet (14) for secondary air introduction at a downstream side. Between the catalyst a1 (26) and the catalyst b3 (42) was provided a second inlet (16) for secondary air introduction. The distance between the engine exhaust port and the catalyst a1 (26) was 1,000 mm; and the distances between the catalyst a1 (26) and the catalyst b3 (42), between the catalyst b3 (42) and the adsorbent-catalyst f2 (62), between the adsorbent-catalyst f2 (62) and the catalyst b2 (40) and between the catalyst b2 (40) and the catalyst d2 (54) were each 70 mm.

(System VII)

Figure 10:
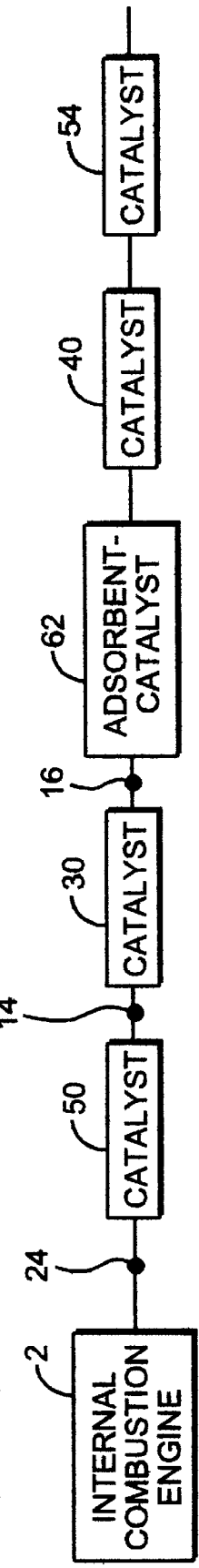
FIG. 10 is a schematic drawing showing the system for exhaust gas purification used in Example 7.

As shown in FIG. 10, in the exhaust gas line of an engine (2) were provided a catalyst c1 (50), a catalyst a3 (30), an adsorbent-catalyst f2 (62), a catalyst b2 (40) and a catalyst d2 (54) in this order from the engine (2) side. Between the engine (2) and the catalyst c1 (50) was provided an $O_2$ sensor (24) for A/F ratio control. Between the catalyst c1 (50) and the catalyst a3 (30) was provided a first inlet (14) for secondary air introduction. Between the catalyst a3 (30) and the adsorbent-catalyst f2 (62) was provided a second inlet (16) for secondary air introduction. The distance between the engine exhaust port and the catalyst c1 (50) was 1,000 mm; and the distances between the catalyst c1 (50) and the catalyst a3 (30), between the catalyst a3 (30) and the adsorbent-catalyst f2 (62), between the adsorbent-catalyst f2 (62) and the catalyst b2 (40) and between the catalyst b2 (40) and the catalyst d2 (54) were each 70 mm.

(System VIII)

Figure 11:
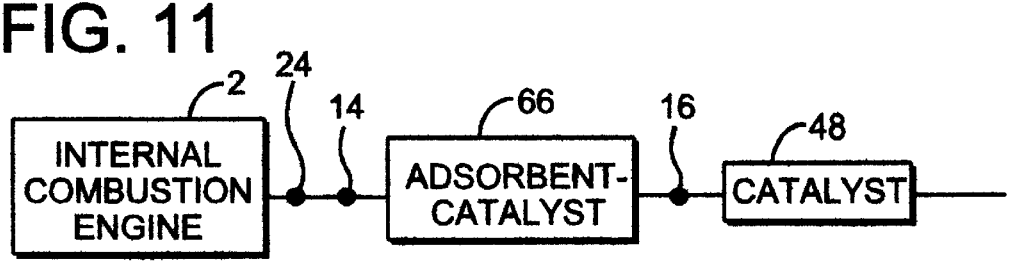
FIG. 11 is a schematic drawing showing the system for exhaust gas purification used in Example 8.

As shown in FIG. 11, in the exhaust gas line of an engine (2) were provided an adsorbent-catalyst g1 (66) and a catalyst b6 (48) in this order from the engine (2) side. Between the engine (2) and the adsorbent-catalyst g1 (66) were provided an $O_2$ sensor (24) for A/F ratio control at an upstream side and a first inlet (14) for secondary air introduction at a downstream side. Between the adsorbent-catalyst g1 (66) and the catalyst b6 (48) was provided a second inlet (16) for secondary air introduction. The distance between the engine exhaust port and the adsorbent-catalyst g1 (66) was 1,000 mm, and the distance between the adsorbent-catalyst g1 (66) and the catalyst b6 (48) was 70 mm.

(System IX)

Figure 12:
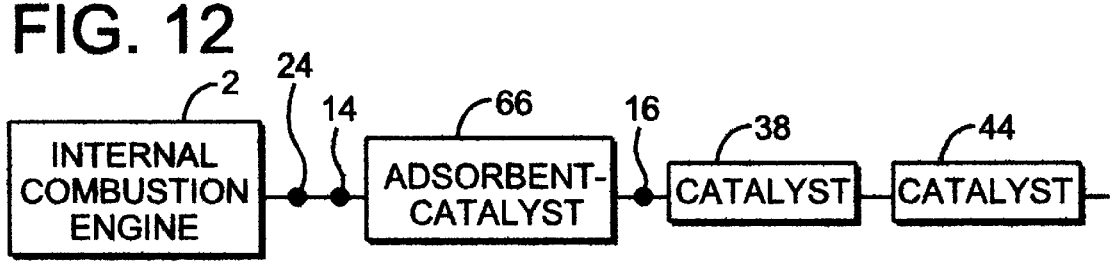
FIG. 12 is a schematic drawing showing the system for exhaust gas purification used in Example 9.

As shown in FIG. 12, in the exhaust gas line of an engine (2) were provided an adsorbent-catalyst g1 (66), a catalyst b1 (38) and a catalyst b4 (44) in this order from the engine (2) side. Between the engine (2) and the adsorbent-catalyst g1 (66) were provided an $O_2$ sensor (24) for A/F ratio control at an upstream side and a first inlet (14) for secondary air introduction at a downstream side. Between the adsorbent-catalyst g1 (66) and the catalyst b1 (38) was provided a second inlet (16) for secondary air introduction. The distance between the engine exhaust port and the adsorbent-catalyst g1 (66) was 1,000 mm; and the distances between the adsorbent-catalyst g1 (66) and the catalyst b1 (38) and between the catalyst b1 (38) and the catalyst b4 (44) were each 70 mm.

(System X)

Figure 13:
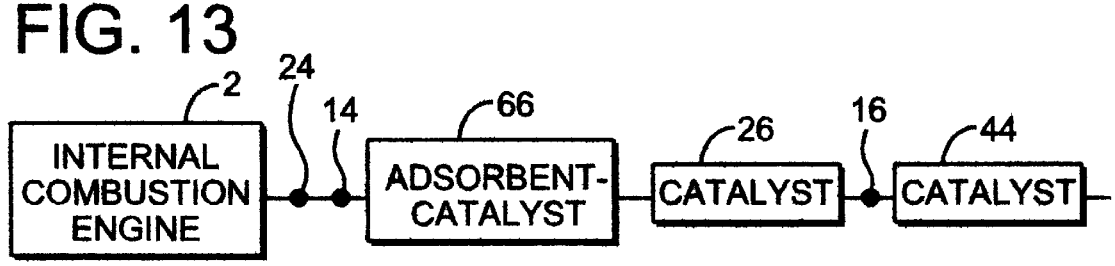
FIG. 13 is a schematic drawing showing the system for exhaust gas purification used in Example 10.

As shown in FIG. 13, in the exhaust gas line of an engine (2) were provided an adsorbent-catalyst g1 (66), a catalyst a1 (26) and a catalyst b4 (44) in this order from 3 the engine (2) side. Between the engine (2) and the adsorbent-catalyst g1 (66) were provided an $O_2$ sensor (24) for A/F ratio control at an upstream side and a first inlet (14) for secondary air introduction at a downstream side. Between the catalyst a1 (26) and the catalyst b4 (44) was provided a second inlet (16) for secondary air introduction. The distance between the engine exhaust port and the adsorbent-catalyst g1 (66) was 1,000 mm; and the distances between the adsorbent-catalyst g1 (66) and the catalyst a1 (26) and between the catalyst a1 (26) and the catalyst b4 (44) were each 70 mm.

(System XI)

Figure 14:
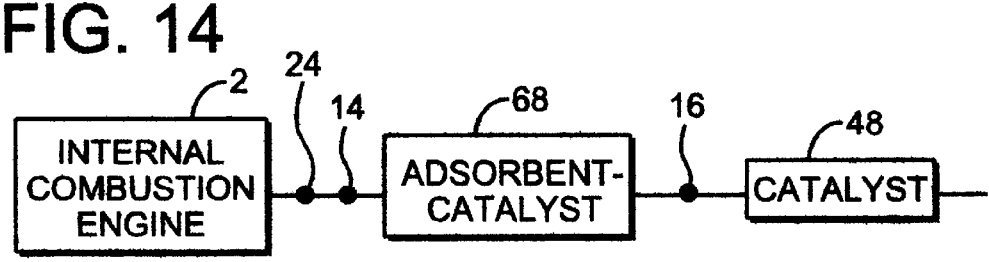
FIG. 14 is a schematic drawing showing the system for exhaust gas purification used in Example 11.

As shown in FIG. 14, a system XI was constituted in the same manner as in the case of the system VIII except that the adsorbent-catalyst g1 (66) used in the system VIII was replaced by an adsorbent-catalyst g2 (68).

(System XII)

Figure 15:
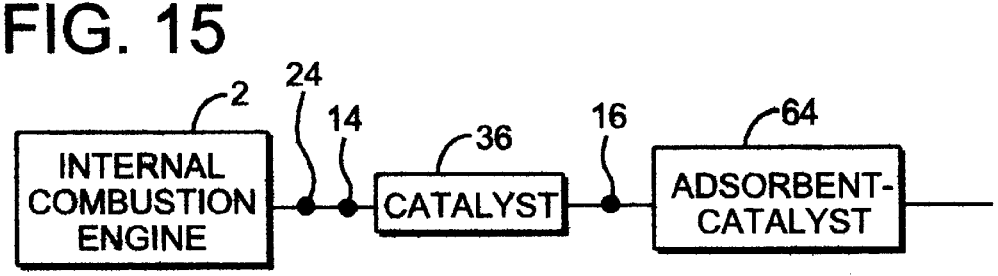
FIG. 15 is a schematic drawing showing the system for exhaust gas purification used in Example 12.

As shown in FIG. 15, in the exhaust gas line of an engine (2) were provided a catalyst a6 (36) and an adsorbent-catalyst f3 (64) in this order from the engine (2) side. Between the engine (2) and the catalyst a6 (36) were provided an $O_2$ sensor (24) for A/F ratio control at an upstream side and a first inlet (14) for secondary air introduction at a downstream side. Between the catalyst a6 (36) and the adsorbent-catalyst f3 (64) was provided a second inlet (16) for secondary air introduction. The distance between the engine exhaust port and the catalyst a6 (36) was 1,000 mm, and the distance between the catalyst a6 (36) and the adsorbent-catalyst f3 (64) was 70 mm.

(System XIII)

As shown in FIG. 16, in the exhaust gas line of an engine (2) were provided a catalyst a1 (26), a catalyst a4 (32) and an adsorbent-catalyst f3 (64) in this order from the engine (2) side. Between the engine (2) and the catalyst a1 (26) were provided an $O_2$ sensor (24) for A/F ratio control at an upstream side and a first inlet (14) for secondary air introduction at a downstream side. Between the catalyst a1 (26) and the catalyst a4 (32) was provided a second inlet (16) for secondary air introduction. The distance between the engine exhaust port and the catalyst a1 (26) was 1,000 mm; and the distances between the catalyst a1 (26) and the catalyst a4 (32) and between the catalyst a4 (32) and the adsorbent-catalyst f3 (64) were each 70 mm.

(System XIV)

As shown in FIG. 17, in the exhaust gas line of an engine (2) were provided a catalyst a5 (34), an adsorbent e1 (56), an adsorbent-catalyst f1 (60) and a catalyst b6 (48) in this order from the engine (2) side. Between the engine (2) and the catalyst a5 (34) were provided an $O_2$ sensor (24) for A/F ratio control at an upstream side and a first inlet (14) for secondary air introduction at a downstream side. Between the catalyst a5 (34) and the adsorbent e1 (56) was provided a second inlet (16) for secondary air introduction. The distance between the engine exhaust port and the catalyst a5 (34) was 1,000 mm; and the distances between the catalyst a5 (34) and the adsorbent e1 (56), between the adsorbent e1 (56) and the adsorbent-catalyst f1 (60) and between the adsorbent-catalyst f1 (60) and the catalyst b6 (48) were each 70 mm.

(System XV)

As shown in FIG. 18, a system XV was constituted in the same manner as in the case of the system II except that an EHC (70) was provided upstream of the catalyst a5 (34) of the system II in contact with the catalyst a5 (34).

(System XVI)

Figure 19:
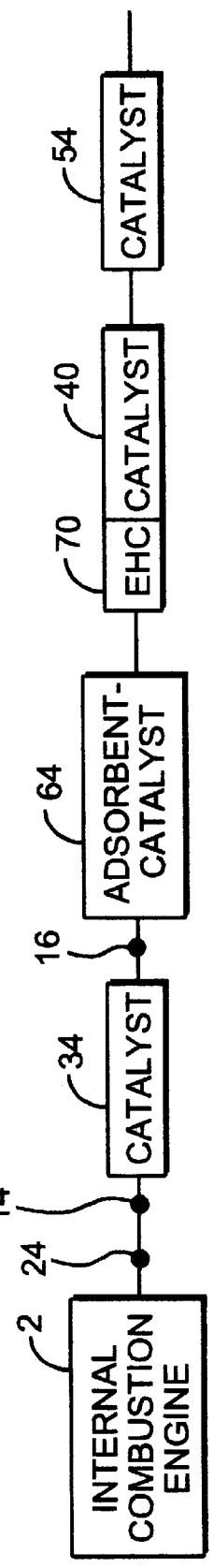
FIG. 19 is a schematic drawing showing the system for exhaust gas purification used in Example 16.

As shown in FIG. 19, a system XVI was constituted in the same manner as in the case of the system I except that an EHC (70) was provided upstream of the catalyst b2 (40) of the system I in contact with the catalyst b2 (40).

(System XVII)

Figure 20:
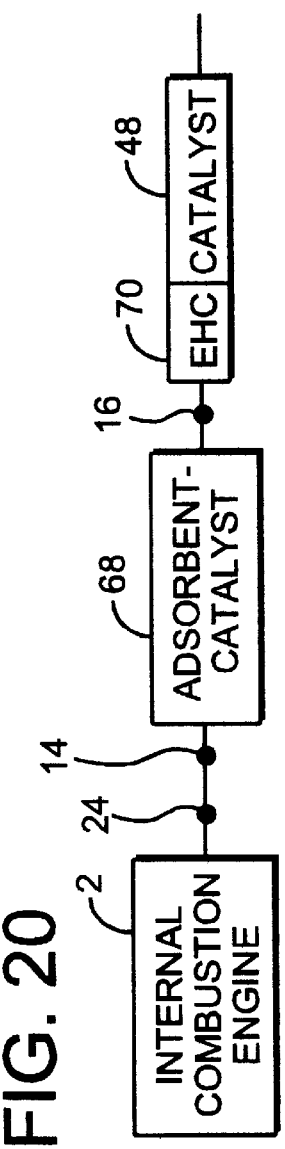
FIG. 20 is a schematic drawing showing the system for exhaust gas purification used in Example 17.

As shown in FIG. 20, a system XVII was constituted in the same manner as in the case of the system XI except that an EHC (70) was provided upstream of the catalyst b6 (48) of the system XI in contact with the catalyst b6 (48).

(System XVIII)

Figure 21:
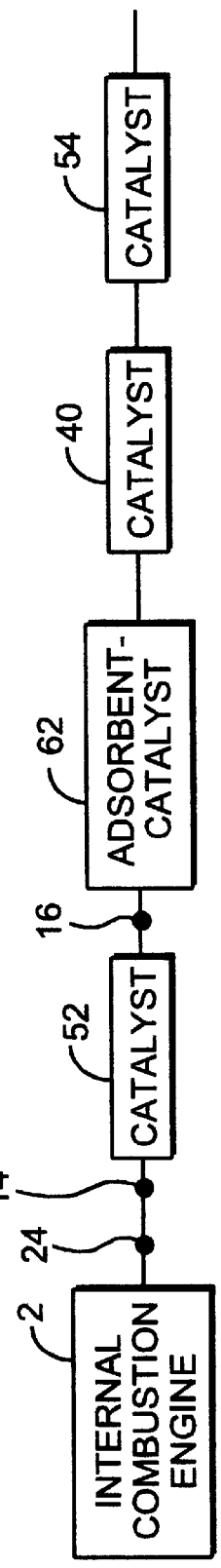
FIG. 21 is a schematic drawing showing the system for exhaust gas purification used in Example 18.

As shown in FIG. 21, in the exhaust gas line of an engine (2) were provided a catalyst d1 (52), an adsorbent-catalyst f2 (62), a catalyst b2 (40) and a catalyst d2 (54) in this order from the engine (2) side. Between the engine (2) and the catalyst d1 (52) were provided an $O_2$ sensor (24) for A/F ratio control at an upstream side and a first inlet (14) for secondary air introduction at a downstream side. Between the catalyst d1 (52) and the adsorbent-catalyst f2 (62) was provided a second inlet (16) for secondary air introduction. The distance between the engine exhaust port and the catalyst d1 (52) was 1,000 mm; and the distances between the catalyst d1 (52) and the adsorbent-catalyst f2 (62), between the adsorbent-catalyst f2 (62) and the catalyst b2 (40) and between the catalyst b2 (40) and the catalyst d2 (54) were each 70 mm.

(System XIX)

As shown in FIG. 22, a system XIX was constituted in the same manner as in the case of the system XVIII except that the catalyst d1 (52) of the system XVIII was replaced by a catalyst b5 (46).

(System XX)

As shown in FIG. 23, in the exhaust gas line of an engine (2) were provided a catalyst a5 (34), an adsorbent-catalyst f2 (62), a catalyst a2 (28) and a catalyst d2 (54) in this order from the engine (2) side. Between the engine (2) and the catalyst a5 (34) were provided an $O_2$ sensor (24) for A/F ratio control at an upstream side and a first inlet (14) for secondary air introduction at a downstream side. Between the catalyst a5 (34) and the adsorbent-catalyst f2 (62) was provided a second inlet (16) for secondary air introduction. The distance between the engine exhaust port and the catalyst a5 (34) was 1,000 mm; and the distances between the catalyst a5 (34) and the adsorbent-catalyst f2 (62), between the adsorbent-catalyst f2 (62) and the catalyst a2 (28) and between the catalyst a2 (28) and the catalyst d2 (54) were each 70 mm.

(System XXI)

As shown in FIG. 24, a system XXI was constituted in the same manner as in the case of the system I except that the adsorbent-catalyst f3 (64) of the system I was replaced by an adsorbent e2 (58).

(System XXII)

A system XXII was constituted in the same manner as in the case of the system II except that only the position of the catalyst a5 (34) was made closer to the engine exhaust port so that the distance between the engine exhaust port and the catalyst a5 (34) became 800 mm.

(System XXIII)

As shown in FIG. 25, in the exhaust gas line of an engine (2) were provided a catalyst a5 (34), an adsorbent-catalyst f2

(62), a catalyst b2 (40) and a catalyst d2 (54) in this order from the engine (2) side. Between the engine (2) and the catalyst a5 (34) was provided an $O_2$ sensor (24) for A/F ratio control. The distance between the engine exhaust port and the catalyst a5 (34) was 1,000 mm; and the distances between the catalyst a5 (34) and the adsorbent-catalyst f2 (62), between the adsorbent-catalyst f2 (62) and the catalyst b2 (40) and between the catalyst b2 (40) and the catalyst d2 (54) were each 70 mm.

(System XXIV)

As shown in FIG. 26, in the exhaust gas line of an engine (2) were provided a catalyst a5 (34), an adsorbent-catalyst f2 (62), a catalyst b2 (40) and a catalyst d2 (54) in this order from the engine (2) side. Between the engine (2) and the catalyst a5 (34) were provided an $O_2$ sensor (24) for A/F ratio control at an upstream side and an inlet (22) for secondary air introduction at a downstream side. The distance between the engine exhaust port and the catalyst a5 (34) was 1,000 mm; and the distances between the catalyst a5 (34) and the adsorbent-catalyst f2 (62), between the adsorbent-catalyst f2 (62) and the catalyst b2 (40) and between the catalyst b2 (40) and the catalyst d2 (54) were each 70 mm.

(System XXV)

As shown in FIG. 27, a system XXV was constituted in the same manner as in the case of the system XXIV except that the adsorbent-catalyst f2 (62) of the system XXIV was replaced by an adsorbent-catalyst f3 (64).

(System XXVI)

As shown in FIG. 28, in the exhaust gas line of an engine (2) were provided an adsorbent-catalyst g1 (66) and a catalyst b2 (40) in this order from the engine (2) side. Between the engine (2) and the adsorbent-catalyst g1 (66) were provided an $O_2$ sensor (24) for A/F ratio control at an upstream side and an inlet (22) for secondary air introduction at a downstream side. The distance between the engine exhaust port and the adsorbent-catalyst g1 (66) was 1,000 mm, and the distance between the adsorbent-catalyst g1 (66) and the catalyst b2 (40) was 70 mm.

(System XXVII)

As shown in FIG. 29, in the exhaust gas line of an engine (2) were provided a catalyst a6 (36) and an adsorbent-catalyst f3 (64) in this order from the engine (2) side. Between the engine (2) and the catalyst a6 (36) were provided an $O_2$ sensor (24) for A/F ratio control at an upstream side and an inlet (22) for secondary air introduction at a downstream side. The distance between the engine exhaust port and the catalyst a6 (36) was 1,000 mm, and the distance between the catalyst a6 (36) and the adsorbent-catalyst f3 (64) was 70 mm.

[Evaluation of exhaust gas purification systems]

Each of the above-prepared systems I to XXVII was fitted to a test vehicle having a V6 engine of 3,800 cc displacement mounted thereon. A FTP (LA-4 mode) was conducted under the conditions shown in Table 4 or 5. An air pump was used for introduction of secondary air. Electrification of EHC was conducted at 2 kW using a 12-kV battery. The exhaust gas discharged from the engine was collected by the CVS method and measured for emission values. The results (Bag 1 emissions) are shown in Table 4 or 5.

TABLE 4

| | | Introduction period (*1) of secondary air and its introduction amount | | Electrification period of | Bag 1 emissions (g/mile) | | |
|---|---|---|---|---|---|---|---|
| | System | First inlet | Second inlet | EHC (*2) | CO | HC | $NO_x$ |
| Example 1 | I | 0–70 seconds (100 1/min) | 70–180 seconds (60 1/min) | — | 2.46 | 0.221 | 0.726 |
| Example 2 | II | 0–70 seconds (100 1/min) | 70–200 seconds (60 1/min) | — | 2.43 | 0.210 | 0.724 |
| Example 3 | III | 0–70 seconds (100 1/min) | 70–200 seconds (60 1/min) | — | 2.48 | 0.212 | 0.755 |
| Example 4 | IV | 0–70 seconds (100 1/min) | 70–200 seconds (60 1/min) | — | 2.49 | 0.218 | 0.723 |
| Example 5 | V | 0–70 seconds (100 1/min) | 70–200 seconds (60 1/min) | — | 2.53 | 0.213 | 0.722 |
| Example 6 | VI | 0–50 seconds (100 1/min) | 50–200 seconds (60 1/min) | — | 2.52 | 0.208 | 0.795 |
| Example 7 | VII | 0–70 seconds (100 1/min) | 70–200 seconds (60 1/min) | — | 3.21 | 0.219 | 0.734 |
| Example 8 | VIII | 0–100 seconds (100 1/min) | 100–250 seconds (60 1/min) | — | 3.32 | 0.226 | 0.853 |
| Example 9 | IX | 0–100 seconds (100 1/min) | 100–250 seconds (60 1/min) | — | 3.20 | 0.225 | 0.850 |
| Example 10 | X | 0–100 seconds (100 1/min) | 100–250 seconds (60 1/min) | — | 3.25 | 0.229 | 0.806 |
| Example 11 | XI | 0–100 seconds (100 1/min) | 100–230 seconds (60 1/min) | — | 2.58 | 0.237 | 0.791 |
| Example 12 | XII | 0–80 seconds (100 1/min) | 80–220 seconds (60 1/min) | — | 2.54 | 0.234 | 0.745 |
| Example 13 | XIII | 0–50 seconds (100 1/min) | 50–220 seconds (60 1/min) | — | 2.63 | 0.232 | 0.791 |
| Example 14 | XIV | 0–70 seconds (100 1/min) | 70–200 seconds (60 1/min) | — | 2.50 | 0.230 | 0.760 |
| Example 15 | XV | 0–50 seconds (100 1/min) | 50–150 seconds (60 1/min) | 0–40 seconds | 1.56 | 0.185 | 0.503 |
| Example 16 | XVI | 0–70 seconds (100 1/min) | 70–180 seconds (60 1/min) | 40–80 seconds | 2.35 | 0.199 | 0.721 |
| Example 17 | XVII | 0–100 seconds (100 1/min) | 100–230 seconds (60 1/min) | 70–110 seconds | 2.51 | 0.214 | 0.773 |
| Example 18 | XVIII | 0–70 seconds (100 1/min) | 70–200 seconds (60 1/min) | — | 2.36 | 0.220 | 0.746 |
| Example 19 | XIX | 0–70 seconds (100 1/min) | 70–200 seconds (60 1/min) | — | 2.47 | 0.212 | 0.904 |
| Example 20 | XX | 0–70 seconds (100 1/min) | 70–200 seconds (60 1/min) | — | 2.42 | 0.210 | 0.716 |
| Example 21 | XXI | 0–70 seconds (100 1/min) | 70–200 seconds (60 1/min) | — | 2.57 | 0.219 | 0.727 |
| Example 22 | II | 0–60 seconds (100 1/min) | 70–200 seconds (60 1/min) | — | 2.55 | 0.214 | 0.717 |
| Example 23 | XXII | 0–60 seconds (100 1/min) | 70–200 seconds (60 1/min) | — | 2.13 | 0.207 | 0.704 |
| Example 24 | II | 0–80 seconds (100 1/min) | 70–200 seconds (60 1/min) | — | 2.44 | 0.211 | 0.753 |
| Example 25 | II | 20–70 seconds (100 1/min) | 70–200 seconds (60 1/min) | — | 2.58 | 0.212 | 0.722 |
| Example 26 | II | 0–50 seconds (100 1/min) 50–70 seconds (60 1/min) | 70–200 seconds (60 1/min) | — | 2.29 | 0.205 | 0.687 |
| Example 27 | II | 0–70 seconds (100 1/min) | 70–140 seconds (30 1/min) 140–200 seconds (60 1/min) | — | 2.42 | 0.204 | 0.719 |

(*1) . (*2): Each indicates a period based on engine start. For example, "0–70 seconds" indicates a period from (0 seconds from engine start) to (70 seconds from engine start); and "70–180 seconds" indicates a period from (70 seconds from engine start) to (180 seconds from engine start).

TABLE 5

| | System | Introduction period of secondary air and its introduction amount | Bag 1 emissions (g/mile) | | |
|---|---|---|---|---|---|
| | | | CO | HC | NO$_x$ |
| Comparative Example 1 | XXIII | No introduction of secondary air | 4.51 | 0.426 | 0.785 |
| Comparative Example 2 | XXIV | 0–70 seconds (100 1/min) 70–200 seconds (60 1/min) | 2.44 | 0.217 | 1.569 |
| Comparative Example 3 | XXIV | 0–70 seconds (100 1/min) | 2.43 | 0.324 | 0.720 |
| Comparative Example 4 | XXIV | 70–200 seconds (60 1/min) | 4.39 | 0.381 | 1.588 |
| Comparative Example 5 | XXV | 0–70 seconds (100 1/min) 70–200 seconds (60 1/min) | 2.47 | 0.229 | 1.552 |
| Comparative Example 6 | XXVI | 0–100 seconds (100 1/min) 100–250 seconds (60 1/min) | 3.36 | 0.232 | 1.764 |
| Comparative Example 7 | XXVII | 0–80 seconds (100 1/min) 80–220 seconds (60 1/min) | 2.57 | 0.241 | 1.635 |

As is clear from Tables 4 and 5, Examples 1–27 according to the present invention could reduce NOx emission as compared with Comparative Examples 2, 5, 6 and 7 wherein secondary air was introduced from an ordinary single position between engine and exhaust gas purification system and was not introduced from two positions (one position for promotion of catalyst activation and the other position for promotion of desorbed HC purification). Further, in Comparative Example 1 wherein no secondary air was introduced and Comparative Example 3 wherein only secondary air for promotion of catalyst activation was introduced, although NOx emission could be reduced to about those of Examples 1–27, HC emission was sacrificed and the HC adsorbability possessed by the adsorbent or the adsorbent-catalyst could not be sufficiently utilized.

As appreciated from the above description, the method for exhaust gas purification according to the present invention can effectively purify the HC discharged in a large amount from an internal combustion engine during the cold start, without adversely affecting the purification of NOx.

What is claimed is:

1. A method for exhaust gas purification by the use of a system for exhaust gas purification, which system comprises:

(a) an adsorbent containing an adsorbent component capable of absorbing hydrocarbons present in the exhaust gas emitted from an internal combustion engine, provided in the exhaust pipe of the engine, (b) at least one catalyst containing a catalyst component capable of reducing harmful substances present in the exhaust gas, provided in the exhaust pipe at a site upstream of the adsorbent in the flow direction of the exhaust gas, (c) at least one catalyst containing a catalyst component capable of reducing harmful substances present in the exhaust gas, provided in the exhaust pipe at a site downstream of the adsorbent in the flow direction of the exhaust gas, (d) a first inlet for introduction of secondary air into exhaust gas, formed in the exhaust pipe at a site upstream of the most downstream catalyst of the catalyst (b), and (e) a second inlet for introduction of secondary air into exhaust gas, formed in the exhaust pipe at a site between the catalyst (b) and the most, downstream catalyst of the catalyst (c), which method comprises introducing secondary air from the first inlet for a period from engine start to the activation of the catalyst (b) provided upstream of the adsorbent;

at the timing when the catalyst (b) has boon activated, stopping the introduction of secondary air from the first inlet; and introducing secondary air from the second inlet while the hydrocarbons of exhaust gas adsorbed by the adsorbent (a) are desorbed from the adsorbent (a) with the temperature rise of the adsorbent (a) brought about by the hat of the exhaust gas, wherein the stopping of the introduction of secondary air from the first inlet is simultaneous with the starting of the introduction of secondary air from the second inlet.

2. A method for exhaust gas purification according to claim 1, wherein other oxidizing gas is used in place of secondary air.

3. A method for exhaust gas purification according to claim 1, wherein the catalyst comprises a monolithic carrier and a catalyst component supported thereon.

4. A method for exhaust gas purification according to claim 1, wherein the catalyst component comprises at least one noble metal selected from the group consisting of Pt, Pd and Rh and a heat-resistant oxide as a substrate for the noble metal.

5. A method for exhaust gas purification according to claim 1, wherein the adsorbent comprises a monolithic carrier and an adsorbent component supported thereon.

6. A method for exhaust gas purification according to claim 1, wherein the adsorbent contains not only an adsorbent component but also a catalyst component capable of reducing harmful substances present in the exhaust gas.

7. A method for exhaust gas purification according to claim 5, wherein the adsorbent has at least one blowing-through hole having a diameter larger than that of the passages of the monolithic carrier.

8. A method for exhaust gas purification according to claim 1, wherein the adsorbent component is composed mainly of zeolite.

9. A method for exhaust gas purification according to claim 8, wherein zeolite has a Si/Al molar ratio of 40 or more.

10. A method for exhaust gas purification according to claim 8, wherein zeolite contains at least one ion selected from the ions of IB group elements Cu, Ag and Au of periodic table.

11. A method for exhaust gas purification according to claim 10, wherein the content of the ion of IB group element in zeolite is 20% or more based on the Al atoms in zeolite.

12. A method for exhaust gas purification according to claim 10, wherein zeolite further contains at least one of the ions of Mg, Ca, Sr, Ba, Y, La, Ti, Ce, Mn, Fe, Cr, Ni and Zn.

13. A method for exhaust gas purification according to claim 1, wherein an electrical heater is provided in the exhaust pipe.

14. A method for exhaust gas purification by the use of a system for exhaust gas purification, which system comprises:

(a) an adsorbent containing an adsorbent component capable of adsorbing hydrocarbons present in the exhaust gas emitted from an internal combustion engine, provided in the exhaust pipe of the engine, (b) at least one catalyst containing a catalyst component capable of reducing harmful substances present in the exhaust gas, provided in the exhaust pipe at a site upstream of the adsorbent in the flow direction of the exhaust gas, (c) at least one catalyst containing a catalyst component capable of reducing harmful substances present in the exhaust gas, provided in the exhaust pipe at a site downstream of the adsorbent in the flow direction of the exhaust gas, (d) a first inlet for introduction of secondary air into exhaust gas, formed in the exhaust pipe at a site upstream of the most downstream catalyst of the catalyst (b), and (e) a second inlet for introduction of secondary air into exhaust gas, formed in the exhaust pipe at a site between the catalyst (b) and the moat downstream catalyst of the catalyst (c), which method comprises introducing secondary air from the first inlet for a period from engine start to the activation of the catalyst (b) provided upstream of the adsorbent;

at the timing when the catalyst (b) has been activated, stopping the introduction of secondary air from the first inlet; and introducing secondary air from the second inlet while the hydrocarbons of exhaust gas adsorbed, by the adsorbent (a) are desorbed from the adsorbent (a) with the temperature rise of the adsorbent (a) brought about by the hat of the exhaust gas, wherein the stopping of the introduction of secondary air from the first inlet is earlier than the starting of the introduction of secondary air from the second inlet.

15. A method for exhaust gas purification according to claim 14, wherein other oxidizing gas is used in place of secondary air.

16. A method for exhaust gas purification according to claim 14, wherein the catalyst comprises a monolithic carrier and a catalyst component supported thereon.

17. A method for exhaust gas purification according to claim 14, wherein the catalyst component comprises at least one noble metal selected from the group consisting of Pt, Pd and Rh and a heat-resistant oxide as a substrate for the noble metal.

18. A method for exhaust gas purification according to claim 14, wherein the adsorbent comprises a monolithic carrier and an adsorbent component supported thereon.

19. A method for exhaust gas purification according to claim 14, wherein the adsorbent contains not only an adsorbent component but also a catalyst component capable of reducing harmful substances present in the exhaust gas.

20. A method for exhaust gas purification according to claim 18, wherein the adsorbent has at least one blowing-through hole having a diameter larger than that of the passages of the monolithic carrier.

21. A method for exhaust gas purification according to claim 14, wherein the adsorbent component is composed mainly of zeolite.

22. A method for exhaust gas purification according to claim 21, wherein zeolite has a Si/Al molar ratio of 40 or more.

23. A method for exhaust gas purification according to claim 22, wherein zeolite contains at least one ion selected from the ions of IB group elements Cu, Ag and Au of the periodic table.

24. A method for exhaust gas purification according to claim 23, wherein the content of the ion of the IB group element in zeolite is 20% or more based on the Al atoms in zeolite.

25. A method for exhaust gas purification according to claim 23, wherein zeolite further contains at least one of the ions of Mg, Ca, Sr, Ba, Y, La, Ti, Ce, Mn, Fe, Cr, Ni and Zn.

26. A method for exhaust gas purification according to claim 14, wherein an electrical heater is provided in the exhaust pipe.

27. A method for exhaust gas purification by the use of a system for exhaust gas purification, which system comprises:

(a) an adsorbent containing an adsorbent component capable of adsorbing hydrocarbons present in the exhaust gas emitted from an internal combustion engine, provided in the exhaust pipe of the engine, (b) at least one catalyst containing a catalyst component capable of reducing harmful substances present in the exhaust gas, provided in the exhaust pipe at a site upstream of the adsorbent in the flow direction of the exhaust gas, (c) at least one catalyst containing a catalyst component capable of reducing harmful substances present in the exhaust gas, provided in the exhaust pipe at a site downstream of the adsorbent in the flow direction of the exhaust gas, (d) a first inlet for introduction of secondary air into exhaust gas, formed in the exhaust pipe at a site upstream of the must downstream catalyst of the catalyst (b), and (e) a second inlet for introduction of secondary air into exhaust gas, formed in the exhaust pipe a site between the catalyst (b) and the most downstream catalyst of the catalyst (c), which method comprises introducing secondary air from the first inlet for a period from engine start to the activation of the catalyst (b) provided upstream of the adsorbent;

at the timing when the catalyst (b) has been activated, stopping the introduction of secondary air from the first inlet; and introducing secondary air from the second inlet while hydrocarbons of exhaust gas adsorbed by the adsorbent (a) are desorbed from the adsorbent (a) with the temperature rise of the adsorbent (a) brought about by the hat of the exhaust gas, wherein the stopping of the introduction of secondary air from the first inlet is later than the starting of the introduction of secondary air from the second inlet.

28. A method for exhaust gas purification according to claim 27, wherein other oxidizing gas is used in place of secondary air.

29. A method for exhaust gas purification according to claim 27, wherein the catalyst comprises a monolithic carrier and a catalyst component supported thereon.

30. A method for exhaust gas purification according to claim 27, wherein the catalyst component comprises at least one noble metal selected from the group consisting of Pt, Pd and Rh and a heat-resistant oxide as a substrate for the noble metal.

31. A method for exhaust gas purification according to claim 27, wherein the adsorbent comprises a monolithic carrier and an adsorbent component supported thereon.

32. A method for exhaust gas purification according to claim 27, wherein the adsorbent contains not only an adsorbent component but also a catalyst component capable of reducing harmful substances present in the exhaust gas.

33. A method for exhaust gas purification according to claim 31, wherein the adsorbent has at least one blowing-through hole having a diameter larger than that of the passages of the monolithic carrier.

34. A method for exhaust gas purification according to claim 27, wherein the adsorbent component is composed mainly of zeolite.

35. A method for exhaust gas purification according to claim 34, wherein zeolite has a Si/Al molar ratio of 40 or more.

36. A method for exhaust gas purification according to claim 34, wherein zeolite contains at least one ion selected from the ions of IB group elements Cu, Ag and Au of the periodic table.

37. A method for exhaust gas purification according to claim 36, wherein the content of the ion of the IB group element in zeolite is 20% or more based on the Al atoms in zeolite.

38. A method for exhaust gas purification according to claim 36, wherein zeolite further contains at least one of the ions of Mg, Ca, Sr, Ba, Y, La, Ti, Ce, Mn, Fe, Cr, Ni and Zn.

39. A method for exhaust gas purification according to claim 27, wherein an electrical heater is provided in the exhaust pipe.

40. A system for exhaust gas purification, comprising:

(a) an adsorbent containing an adsorbent component capable of adsorbing hydrocarbons present in the exhaust gas emitted from an internal combustion engine, provided in the exhaust pipe of the engine, (b) at least one catalyst containing a catalyst component capable of reducing harmful substances present in the exhaust gas, provided in the exhaust pipe at a site upstream of the adsorbent in the flow direction of the exhaust gas, (c) at least one catalyst containing a catalyst component capable of reducing harmful substances present in the exhaust gas, provided in the exhaust pipe at a site downstream of the adsorbent in the flow direction of the exhaust gas, (d) a first inlet for introduction of secondary air into exhaust gas, formed in the exhaust pipe at a site upstream of the most downstream catalyst of the catalyst (b), (e) a second inlet for introduction of secondary air into exhaust gas, formed in the exhaust pipe at a site between the catalyst (b) and the most downstream catalyst of the catalyst (c), and (f) detecting means for judging the stoppage of the introduction of secondary air from said first inlet located downstream of the most upstream catalyst.

* * * * *